United States Patent [19]
Spitzer

[11] Patent Number: 5,886,822
[45] Date of Patent: Mar. 23, 1999

[54] IMAGE COMBINING SYSTEM FOR EYEGLASSES AND FACE MASKS

[75] Inventor: Mark B. Spitzer, Sharon, Mass.

[73] Assignee: The Microoptical Corporation, Boston, Mass.

[21] Appl. No.: 844,098

[22] Filed: Apr. 18, 1997

Related U.S. Application Data

[60] Provisional application No. 60/027,998 Oct. 8, 1996.

[51] Int. Cl.⁶ .................................................. G02B 27/14
[52] U.S. Cl. ........................................... 359/630; 359/633
[58] Field of Search ................... 359/630, 631, 359/633, 638; 345/7, 8

[56] References Cited

U.S. PATENT DOCUMENTS

| | | | |
|---|---|---|---|
| Re. 28,847 | 6/1976 | Vizenor ................................... | 350/302 |
| 3,192,826 | 7/1965 | Papke ........................................ | 88/1.5 |
| 3,610,825 | 10/1971 | Fritzel ...................................... | 178/7.8 |
| 3,787,109 | 1/1974 | Vizenor ................................... | 350/302 |
| 3,885,095 | 5/1975 | Wolfson et al. ....................... | 178/7.88 |
| 3,915,548 | 10/1975 | Opittek et al. ............................ | 350/3.5 |
| 3,923,370 | 12/1975 | Mostrom .................................. | 350/55 |
| 3,940,204 | 2/1976 | Withrington .............................. | 350/3.5 |
| 4,082,432 | 4/1978 | Kischner .................................. | 350/174 |
| 4,195,915 | 4/1980 | Lichty et al. ............................ | 350/345 |
| 4,218,111 | 8/1980 | Withrington et al. .................. | 350/3.72 |
| 4,447,128 | 5/1984 | Ferrer ...................................... | 350/174 |
| 4,664,475 | 5/1987 | Ferrer ...................................... | 350/174 |
| 4,665,385 | 5/1987 | Henderson .............................. | 340/539 |
| 4,799,765 | 1/1989 | Ferrer ...................................... | 350/174 |
| 4,806,011 | 2/1989 | Bettinger ................................. | 351/158 |
| 4,818,048 | 4/1989 | Moss ........................................ | 350/3.7 |
| 4,826,287 | 5/1989 | Cook et al. .............................. | 350/174 |
| 4,853,306 | 8/1989 | Wreede et al. .............................. | 430/1 |
| 4,867,551 | 9/1989 | Perera ..................................... | 351/158 |
| 4,869,575 | 9/1989 | Kubik ...................................... | 359/630 |
| 4,968,117 | 11/1990 | Chern et al. ........................ | 350/162.24 |
| 4,973,132 | 11/1990 | McDonald et al. ..................... | 350/174 |
| 4,973,139 | 11/1990 | Weinhrauch et al. ................... | 350/345 |
| 5,003,300 | 3/1991 | Wells ...................................... | 340/705 |
| 5,013,134 | 5/1991 | Smith ...................................... | 350/174 |
| 5,028,119 | 7/1991 | Hegg et al. ............................. | 350/174 |
| 5,044,709 | 9/1991 | Smith et al. ............................. | 359/13 |
| 5,050,962 | 9/1991 | Monnier et al. ......................... | 359/13 |
| 5,053,755 | 10/1991 | Smith et al. ............................ | 340/705 |
| 5,129,716 | 7/1992 | Holakovszky et al. .................. | 351/50 |
| 5,138,470 | 8/1992 | Moss et al. .............................. | 359/13 |
| 5,162,828 | 11/1992 | Furness et al. ........................ | 353/122 |
| 5,212,471 | 5/1993 | McDonald .............................. | 340/705 |
| 5,214,425 | 5/1993 | Wreede ................................... | 340/980 |

(List continued on next page.)

*Primary Examiner*—Georgia Epps
*Assistant Examiner*—Ricky Mack
*Attorney, Agent, or Firm*—Weingarten, Schurgin, Gagnebin & Hayes LLP

[57] ABSTRACT

An optical system combines a first image formed by a main lens with a second image provided by an electronic display, slide, or other image source. The image combining system includes one or more inserts such as a set of reflecting image combiners to redirect light on an optical pathway within the main lens to the user's eye. The image combining system is highly compact, allowing the integration of a display system with eyeglasses or a face mask, such as a diver's mask. A number of implementations of the optical system make possible other types of image integration including uses in image acquisition systems such as cameras.

114 Claims, 16 Drawing Sheets

U.S. PATENT DOCUMENTS

| | | | |
|---|---|---|---|
| 5,231,379 | 7/1993 | Wood et al. | 340/705 |
| 5,281,957 | 1/1994 | Schoolman | 345/8 |
| 5,309,169 | 5/1994 | Lippert | 345/8 |
| 5,320,538 | 6/1994 | Baum | 434/307 |
| 5,325,386 | 6/1994 | Jewell et al. | 372/50 |
| 5,334,991 | 8/1994 | Well et al. | 345/8 |
| 5,367,345 | 11/1994 | daSilva | 351/123 |
| 5,381,267 | 1/1995 | Woody | 359/632 |
| 5,384,654 | 1/1995 | Iba | 359/364 |
| 5,392,158 | 2/1995 | Tosaki | 359/633 |
| 5,416,876 | 5/1995 | Ansley et al. | 385/116 |
| 5,455,591 | 10/1995 | Hui | 342/185 |
| 5,459,612 | 10/1995 | Ingleton | 359/630 |
| 5,469,185 | 11/1995 | Lebby et al. | 345/8 |
| 5,491,510 | 2/1996 | Gove | 348/77 |
| 5,506,728 | 4/1996 | Edwards et al. | 359/629 |
| 5,519,410 | 5/1996 | Smalanskas et al. | 345/7 |
| 5,537,253 | 7/1996 | Cox et al. | 359/630 |
| 5,539,578 | 7/1996 | Togino et al. | 359/630 |
| 5,583,590 | 12/1996 | Clupper | 351/200 |
| 5,585,871 | 12/1996 | Linden | 351/158 |
| 5,589,846 | 12/1996 | Kobayashi | 345/8 |
| 5,596,451 | 1/1997 | Handschy et al. | 359/633 |
| 5,606,743 | 2/1997 | Vogt et al. | 455/347 |
| 5,610,765 | 3/1997 | Colucci | 359/633 |
| 5,648,789 | 7/1997 | Beadles et al. | 345/8 |
| 5,654,827 | 8/1997 | Reichert | 359/631 |
| 5,654,828 | 8/1997 | Togino et al. | 359/633 |
| 5,682,173 | 10/1997 | Holakovsky et al. | 345/8 |
| 5,712,649 | 1/1998 | Tosaki | 345/8 |
| 5,717,479 | 2/1998 | Rickards | 351/158 |
| 5,719,588 | 2/1998 | Johnson | 345/8 |
| 5,744,788 | 4/1998 | Metlitsky et al. | 235/454 |
| 5,751,493 | 5/1998 | Hur | 359/630 |

IMAGE COMBINING SYSTEM FOR EYEGLASSES AND FACE MASKS

STATEMENT REGARDING FEDERALLY SPONSORED RESEARCH OR DEVELOPMENT

The invention was made with Government support under Contract No. DAAK60-96-C-3018 awarded by the Soldier Systems Command of the United States Army. The Government has certain rights in the invention.

CROSS REFERENCE TO RELATED APPLICATIONS

This application claims the benefit under 35 U.S.C. § 119(e) of U.S. Provisional Application No. 60/027,998, filed on Oct. 8, 1996, the disclosure of which is incorporated by reference herein.

BACKGROUND OF THE INVENTION

Head mounted image displays (e.g. helmets, goggles, and eyeglasses incorporating miniature displays) and other compact display systems which provide data in alphanumeric, video, or graphic form have applications in avionics, medicine, entertainment, and wearable computers, as well as numerous other fields. See for example U.S. Pat. Nos. 5,348,477, 5,281,960, 4,806,001 and 5,162,828. There are three principal types of prior art head mounted display systems: "see-through systems," in which the displayed electronic image is combined with the ambient imagery so that the user can see both images; "see-around systems" in which the displayed image occludes a part of the ambient imagery; and "full-immersion systems" in which the entire ambient image is blocked, so that the user sees only the electronically generated image. All three types of systems use various means, including lenses and the like, to project the image into the viewer's eyes.

The simplest systems are of the see-around type in which the electronic display is provided with one or more lenses and suspended in front of the user's eyes. A principal limitation of the device is that the display and optical system must be moved with respect to the head, or the head must be moved, to enable the user to see ambient imagery in the occluded field. A second limitation of such devices is that the device is suspended from the head (or helmet, strap or other support borne by the head), so that the mass of apparatus adds an undesirable weight and/or torque to the head. A third limitation of the device is that position of the exit pupil of the optical system cannot be fixed accurately, meaning that the exit pupil of the optical system must be large enough to accommodate various motions of the device that occur during use.

Full-immersion systems have many of the same limitations as see-around systems. The head mounted system must be removed to view any ambient imagery. Typically, the systems comprise displays and lens systems similar to the see-around display, or comprise a display, lens system and reflective screen. These systems involve high weight, torque and volume.

See-through systems involve the most complex optical designs. Generally, the see-through system comprises a display, lens system, and viewing screen or combiner. All of the limitations of the see-around display are shared by the see-through display, except for the need to remove the head-mounted system to see ambient images. However, for this benefit, it is necessary to add further optical components and thus weight to the system.

All three of the above head mounted display types have the further limitation of requiring that the optical systems be mounted in goggles, helmets, strap-on bands, unusually bulky sunglasses frames having large visors and the like, rather than more conventional optical supports (such as the more simple support provided by conventional eyeglass frames). This limitation requires users to become accustomed to wearing such devices.

Another limitation of prior art displays is the need to provide illumination. For example, head mounted display systems using liquid crystal displays require lamps to illuminate the display. These lamps consume power and generate heat near the user's head and add to the overall volume and weight of the system.

A further and key limitation of the prior art is the use of optical paths external to the eyeglasses system. For example, in U.S. Pat. No. 5,348,477, Welch describes a system comprising an image relay and a set of lenses and screens mounted external to an eyeglass frame and eyeglass lens. The use of a free space optical path, combiners and the like make miniaturization in a form approaching conventional eyeglasses quite difficult. Furness et al., in U.S. Pat. No. 5,162,828, have attempted to address this limitation with a see-through system based on a transparent screen, such as found in a goggle, with a display located at the top of the goggle or eyeglasses, and a mirror, which may be fixed or adjustable, located at the bottom of the transparency. This approach shows reduced complexity, but the system still requires at least one mirror positioned in an unconventional exposed location below or behind the transparency. The eyeglasses disclosed by Perera (U.S. Pat. Nos. 4,867,551 and 4,751,691) and Bettinger (U.S. Pat. No. 4,806,011) also require mirrors suspended from eyeglass frames A particular limitation of systems with mechanically suspended mirrors results from the fact that such appendages have a greater probability that the optical surface of the mirror will suffer damage during use, or will break off, or will damage the user's eye upon accidental impact. Additionally, because these systems include unusual optical appendages, they do not approach the ideal form of conventional eye wear.

SUMMARY OF THE INVENTION

This invention comprises an image source or display, a lens system, and an eyeglass frame or face mask. The display may be located remote from the eyeglasses lens by using an image conduit such as a graded index lens conduit, a coherent fiber optic bundle, or a lens image relay so that the display may be located behind the head if desired for balancing the system weight on the head, or for relocating a source of heat (the display or backlight) away from the face, or for cosmetic or other reasons. The eyeglass lens system is formed with one or more combiners formed from internal totally internally reflecting surfaces, partially silvered mirrors, or dielectric coatings, or holographic or diffractive surfaces and one or more optical surfaces for vergence correction, so that the image from the display is relayed to the user's eye internally through the lens to a partially or fully reflecting surface located in the field of view of the user. Additionally, since the lens system is partially transparent to external rays, with partially silvered mirrors or dielectric coatings, ambient scenery is presented relatively unimpeded to the user in the manner of conventional eyeglasses. These optical elements may be embedded within the eyeglass frame or lens so that optical surfaces (lenses or reflectors) may be added to the system to add magnification to the display or to correct the vision of the user in the manner of conventional eyeglasses. The chief advantage of this approach over the prior art is that the optical system is reduced to a form consistent with integration within an eyeglass lens, with the consequent elimination of external appendages and unconventional bulky free space optical components not normally found in conventional eyewear.

Accordingly, the invention provides a see-through, see-around, or full-immersion optical system that provides the optical functions of a head-mounted display system in a compact form. The system can be integrated within eyeglasses or a face mask. The system is also capable of switching from full-immersion to see-around or to see-through without physically moving the display.

The system can use ambient light to illuminate the display and thus can consume less power than prior art systems. The system is also advantageous in that no mechanical appendages are located in front of the user's eyes that could cause eye damage in the event of an accidental impact. Additionally, no exposed reflecting surfaces are present that would be subject to optical degradation. In a further embodiment of the present invention, image capture and eye tracking capabilities are provided.

DESCRIPTION OF THE DRAWINGS

The invention will be more fully understood from the following detailed description taken in conjunction with the accompanying drawings in which.

DETAILED DESCRIPTION OF THE INVENTION

Figure 1:
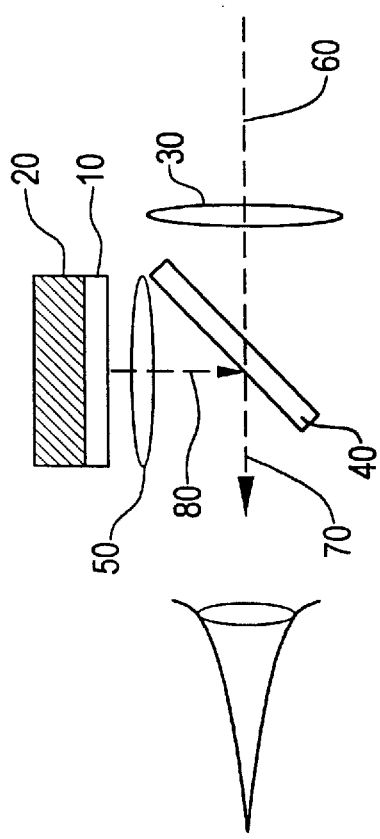
FIG. 1 is a prior art see-through head mounted display system.

FIG. 1 illustrates a prior art see-through head mounted display system based on lenses and combiners. A display 10 and back light 20 are mounted with a lens 50 above the user's line of sight. Rays 80 from the display 10 pass through the lens 50 and reflect from the combiner 40 toward the user's eye. Rays 60 from the ambient scene pass through lens 30 and also pass through combiner 40 and are coincident with rays 80 from the display. Thus the user perceives an image comprising the superposition of rays from the display and the ambient scene. The lenses in this system provide appropriate vergence for the rays so that the image is perceived at the desired depth. Typically the size of the various parts in this system are on the order of 0.5 to 2.0 inches to provide a large exit pupil and require housing and frames that make the system bulky. Additionally, the weight is distributed in such a way as to produce an undesirable torque on the user's head.

Figure 2:
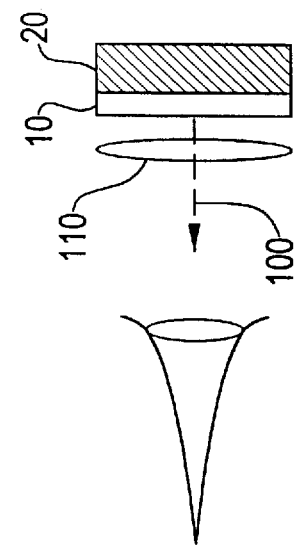
FIG. 2 is a prior art see-around head mounted display system.

FIG. 2 illustrates another prior art head mounted display approach involving a see-around technology. A display 10 and backlight 20 are mounted with a lens 110 so that rays 100 travel to the eye with appropriate vergence. This display system, having fewer parts, is somewhat lighter than the see-through display, but it occludes ambient rays. Additionally, both see-around and see-through displays mounted from hats or headbands have a tendency to snag on items in the environment.

Figure 3:
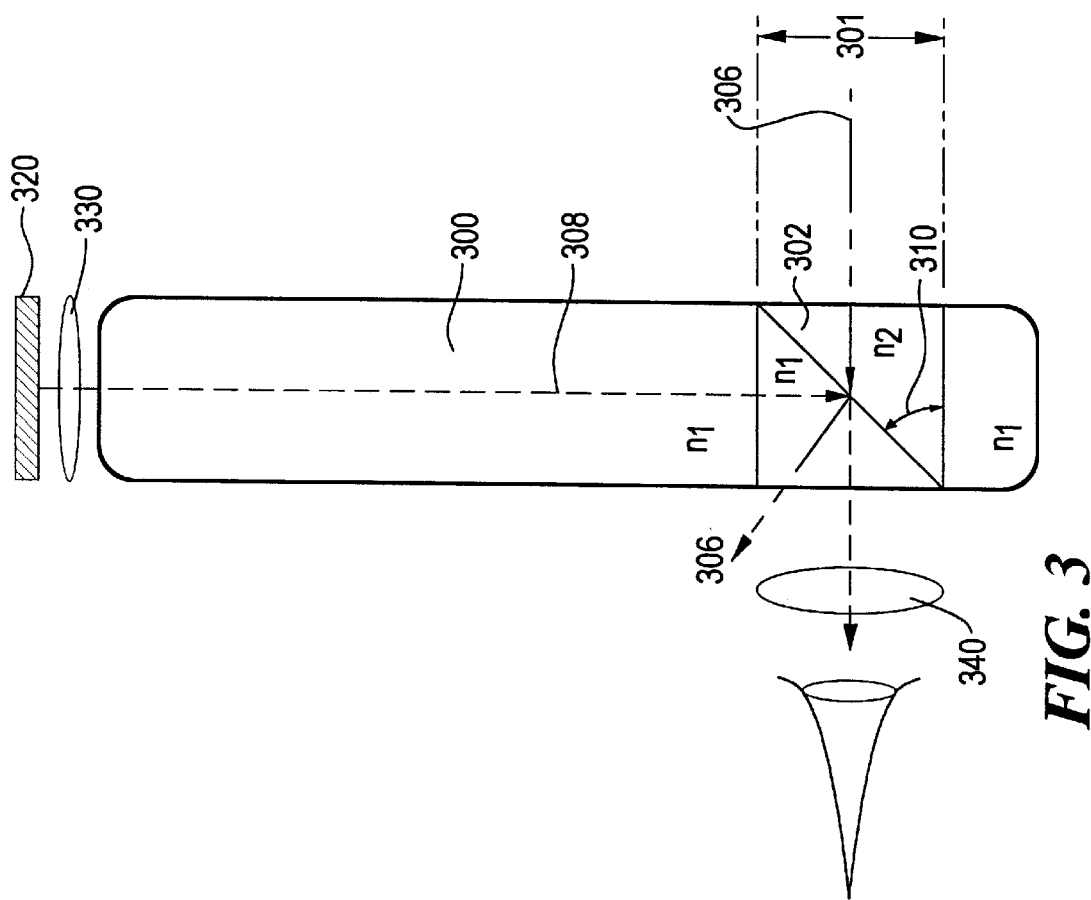
FIG. 3 is a head mounted image combining lens system of the present invention.

One preferred embodiment of the invention is shown in FIG. 3. An image source or display 320 and a lens 330 are mounted at the edge of a second "lens" or lens system 300 hereinafter referred to as "main lens" 300. Main lens 300 is more specifically in the form of an eyeglass lens (with or without vision-correcting optical power) and insert 301, formed for example in the manner of a bifocal insert. It will thus be appreciated that main lens 300 replaces the single lens (or lens system in the case of a bifocal lens) in an eyeglass frame. The main lens 300 may be more precisely referred to as an optical system comprising embedded lenses and other optical components and surfaces, but is referred to here as main lens 300 for simplicity. It should also be appreciated that the term "lens" in general herein refers to a surface with optical power and/or to sets of multiple surfaces of optical power, either refractive, diffractive, reflective or otherwise in nature.

The insert 301 in the main lens 300 comprises two materials of different indices of refraction, $n_1$ and $n_2$, with $n_1$ being greater than $n_2$, so that light rays 308 from the image source 320 traveling through the material of higher refractive index and subsequently incident at the interface 302 between the materials are totally internally reflected toward a third lens 340. Ambient light rays 306 pass through the interface 302 and are refracted away from the third lens 340 thus improving contrast of the displayed image. The two lenses 330 and 340 are chosen such that the combined optical power forms a microscope thus allowing the image from the display to be viewed with the desired magnification. The two materials for example may comprise fused silica ($n_2=1.458$) and LaSFN$_9$ ($n_1=1.85$) so that rays with angle of incidence greater than 52 degrees will be totally internally reflected. Alternatively, an air or other fluid filled gap may be provided between the materials, or the lower index material may comprise air, another fluid or vacuum, so that if fused silica is used for the main lens 300, the critical angle for total internal reflection will be 43 degrees. The angle of the interface 310 may be designed for satisfying the condition that the angle of incidence exceed the critical angle for total internal reflection, and also for satisfying the optical requirements for positioning the image to be viewed. Also, the optical interface shown here is planar; however, it may be curved to provide an optical power.

An alternative embodiment comprises the use of an insert 301 comprising materials having thin-film interference coatings at the interface to combine the light paths, as is commonly accomplished in dielectric beam splitters and combiners. In such a case, the refractive indices $n_1$ and $n_2$ may be the same ($n_1=n_2$). Either method will work; however, the interference coatings are useful in see-through systems, whereas total internal reflection provides greater optical throughput along the desired paths in see-around systems. Metal-coated surfaces may also be used.

The display 320 may comprise a miniature flat panel display, a cathode ray tube or a scanning display as described in U.S. patent application Ser. No. 08/716,103, filed on Sep. 19, 1996, entitled COMPACT DISPLAY SYSTEM, identified by attorney docket No. MOP-101J, assigned to the assignee of the present application and incorporated herein by reference. The display 320 may be responsive to RF video signals with the RF link being analog or digital depending on particular application requirements and available technology.

Figure 4:
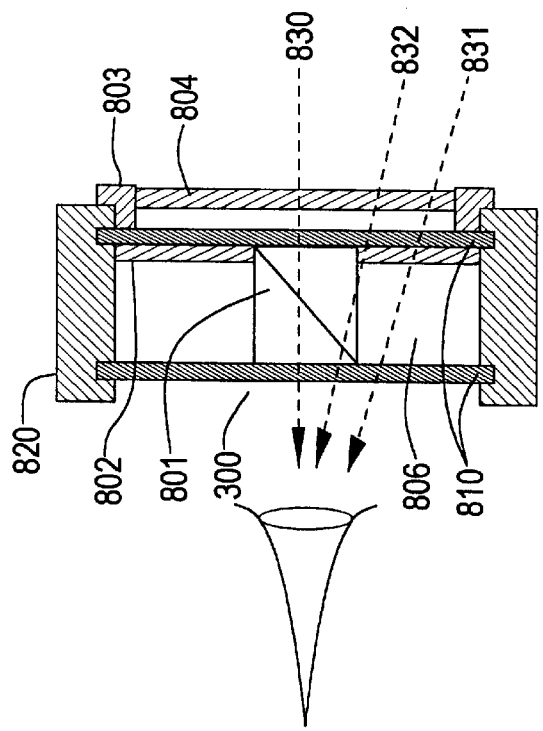
FIG. 4 is a further embodiment of a head mounted image combining lens system of the present invention.

FIG. 4 illustrates another method of forming the image combining system. In this system, a cube beam splitter 801 used in reverse as a combiner replaces the totally reflecting surface described earlier. The cube beam splitter, for example Edmund Scientific Part A45,111, has the advantage over the totally internally reflecting surface of introducing practically no refraction of ambient rays; however, the cube beam splitter only passes approximately 50% of the ambient and display light to the eye. However, for the case in which beam splitter 801 comprises a polarizing beam splitter, and display 320 provides polarized light (such as from a liquid crystal display or laser-scanned display), reflection in the range of 75 to 99% may be obtained, depending on wavelength of the display emission and optical design of the coatings in cube 801. The cube may also serve as an analyzer for a liquid crystal display, since it efficiently passes one polarization and not the other.

In this embodiment, a housing 820 provides a means to hold two glass or plastic plates 810 that are joined to the cube 801, the plates and other internal parts comprising the main lens 300. Light rays from an image source are incident through a hole 821 (see FIG. 6) in housing 820. Ambient rays pass through one of three paths. The first path 830 passes through optional polarizing layer 804, through glass 810, through cube 801, through second glass 810, and then to the eye. A second path 831 passes through optional polarizing layer 804, glass 810, optional polarizing layer 802, second glass 810, and then to the eye. The purpose of the optional polarizing layers is to make possible an adjustment of the light level of the ambient scene reaching the eye to provide a balancing of the light level between the display and the ambient scenery, which is made possible by mounting optional polarizer 804 on a rotating bezel 803.

A third path 832 passes through optional polarizing layer 804, glass 810, optional polarizing layer 802, cube 801, and then through second glass 810 to the eye. Light passing along path 832 will suffer some distortion owing to the off-axis passage through the cube. This effect can be minimized by shaping the beam splitter in a conical form, and by filling the void 806 with a compound optically matched to the cube 801.

The cube beam splitter 801 may be designed and oriented to be sensitive to polarization as previously described, and oriented such that when aligned with the polarizing layer 802, the cube 801 and polarizer 802 absorb equal amounts of rays 830, 832, and 831. If properly aligned, the net transmission of polarized light across the main lens 300 is uniform and the external polarizer 804 may be rotated to adjust the light level of the ambient scene as viewed through the cube or otherwise.

FIGS. 5A–5E and 6A illustrate some of the details of the assembly of an eyeglass frame for the device shown in FIG.

Figure 6A:
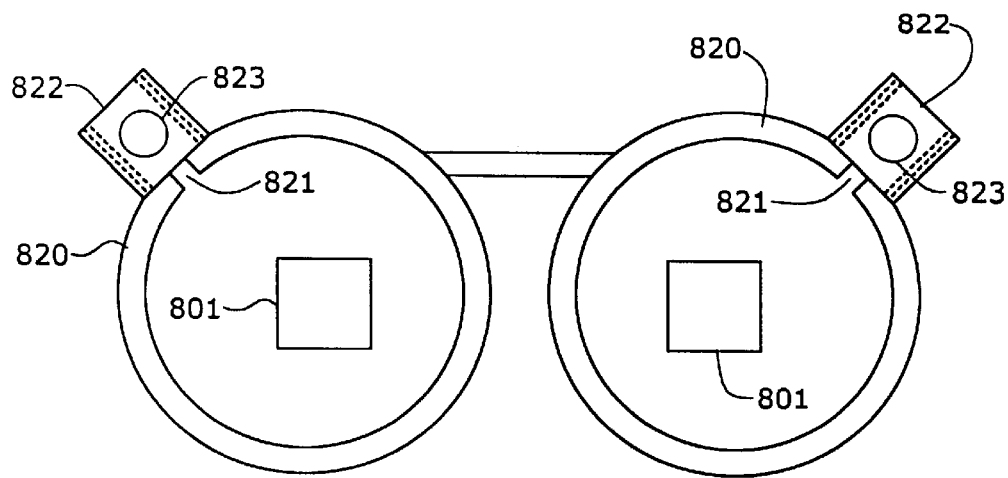
FIG. 6A is a front view of an eyeglass frame for a binocular image combining system.
Figure 6B:
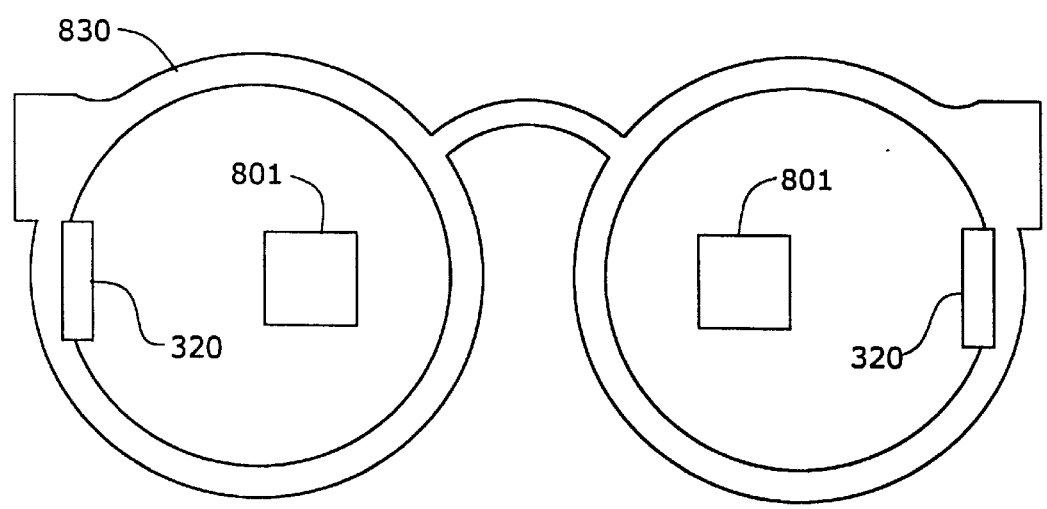
FIG. 6B is a front view of a further embodiment of an eyeglass frame for a binocular image combining system.

4. A triangular block 822 receives a pipe 823 which houses the optical path from the display, described further below. A mirror 824 reflects rays on the light path through an angle of 90°, through the opening 821 to the combiner 801. The block 822 may be mounted to the housing 820 in any suitable manner, for example, by screws 825. Two housings 820 are assembled to form a pair of eyeglasses, as shown in FIG. 6*a*. Referring to FIG. 3, the cube 801 in position 301, lens 340 and display 320 may also be formed within the main lens 300 as a solid casting, which can then be mounted in conventional eyeglass frames 830, as shown in FIG. 6*b*.

Figure 7:
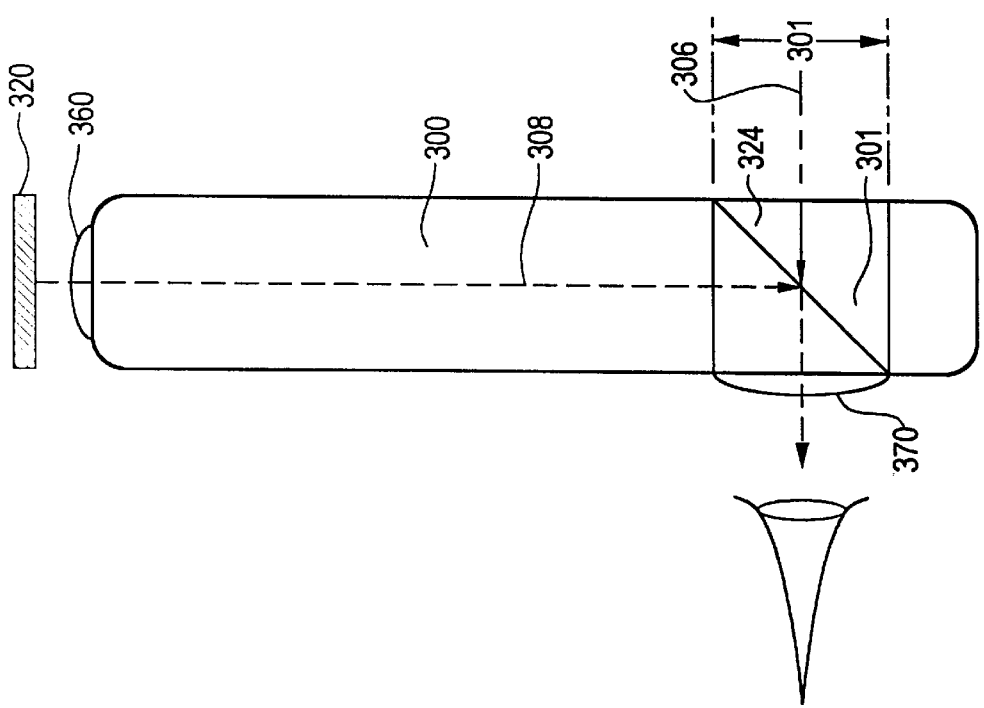
FIG. 7 is a further embodiment of an image combining lens system of the present invention.

FIG. 7 shows another embodiment in which the lenses 330 and 340 are replaced by lenses 360 and 370 respectively, which may be glued to the main lens 300 or which may be formed as part of the main lens 300 if for example the lens is injection molded. The main lens 300 can be formed as a single solid piece by embedding the optical parts in a solid clear or tinted material, such as an optical cement, polycarbonate, epoxy, polymethyl methacrylate, or glass. In such a case, the mold is provided with surfaces that will yield the desired optical power and/or reflections at various places on or within the main lens 300. The main lens 300 may also be formed from a plurality of cast, molded, or machined parts which are then bonded together to form a solid unit, or alternatively which are mounted in the manner shown in FIGS. 4 to 6. A further embodiment of this invention comprises the use of an integrated lens 360 with a separate lens 340 or vice versa. Additionally, lenses 330 and 340, or 360 and 370, or any combination, may comprise achromatic lenses for color correcting dispersion effects in the optical system, or other lens combinations to reduce image aberrations. It should be recognized that lens 360 is optional and may be eliminated in systems requiring simple magnifying optics.

Figure 5A:
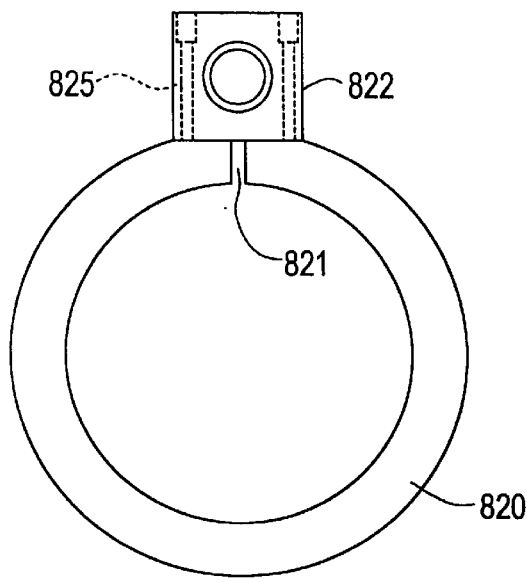
FIG. 5A is a front view of a portion of an eyeglass frame for an image combining system with the combiner removed.
Figure 5B:
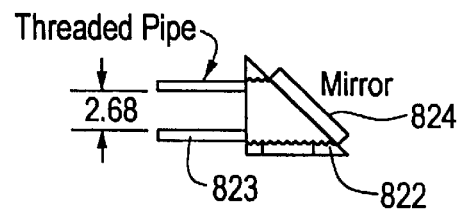
FIG. 5B is a side view of a mount for attachment of an optical path from an image source to the eyeglass frame.
Figure 5C:
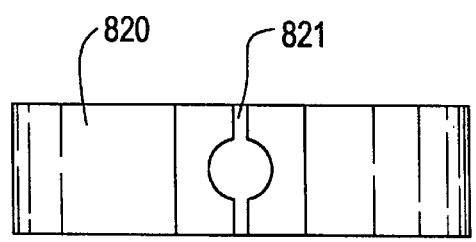
FIG. 5C is a top view of a portion of the eyeglass frame of FIG. 5A with the mount removed.
Figure 5D:
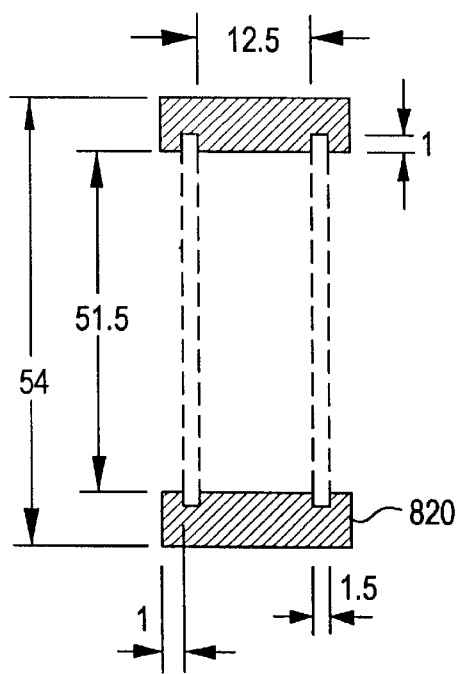
FIG. 5D is a side view of the portion of the eyeglass frame of FIG. 5A with the mount and combiner removed.
Figure 5E:
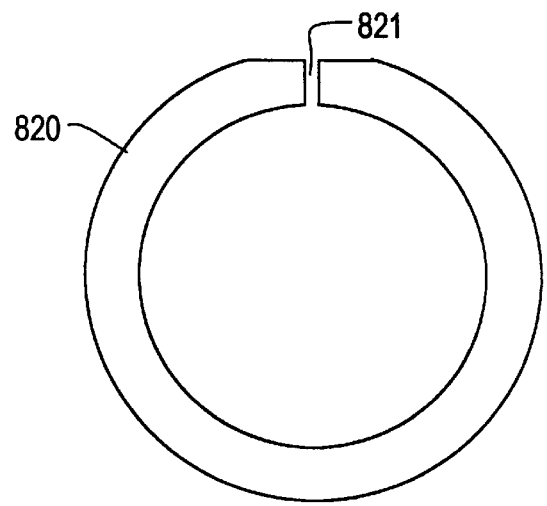
FIG. 5E is a front view of the portion of the eyeglass frame of FIG. 5A with the mount and combiner removed.
Figure 8:
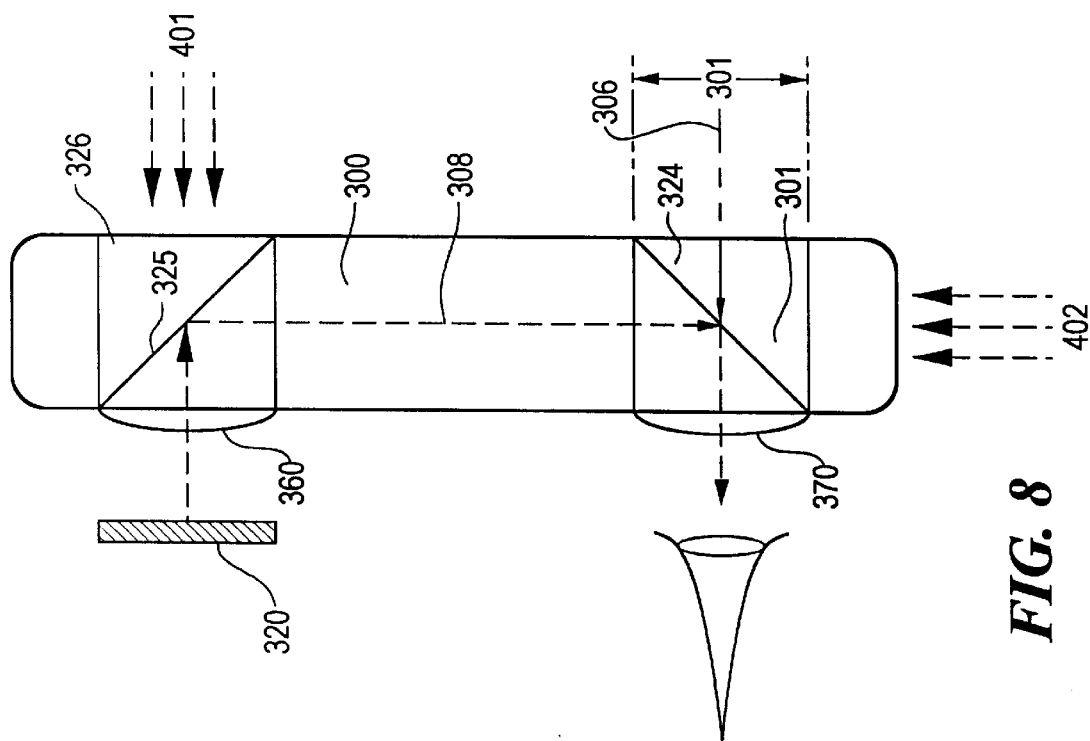
FIG. 8 is a still further embodiment of an image combining lens system of the present invention.

Another embodiment of the lens system is shown in FIG. 8. In this design the lens 360 and display 320 are moved to a position behind the main lens 300. A reflecting surface 325 is provided in the form of a second insert 326 in the main lens 300 for the purpose of directing the incident image to the insert 301. Reflecting surface 325 may be of the type implemented in the insert 301, which itself may comprise cube 802, or alternatively may be replaced by a mirror mounted internal to the main lens 300 or externally, as shown in FIG. 5A. If the second insert 326 is polarizing, such as in a polarizing beam splitter, the insert 301 or insert 326 may act as the analyzing polarizer (the analyzer) for the case in which the image source 320 is a liquid crystal display.

In applications in which the display 320 is capable of providing an intense image display, the mirror may be designed to protect the user's eye in the unlikely event that the display regulating system fails. The mirror (at surface 325), functioning as an optical fuse, may protect the user from injury by being designed to absorb some of the incident light. To this end, one or more layers of materials having low thermal conductivity may be provided beneath the reflective layer of the mirror. With such an arrangement, the light beam may be made to heat the mirror faster than it heats the retina, thereby resulting in damage to the mirror more quickly than to the eye. One of the low conductivity layers beneath the mirror may comprise a material with a high coefficient of thermal expansion which would lead to a bubble or other de-focusing mechanism at the mirror designed to occur at a threshold energy flux below the damage threshold of the retina. The image source may also supply infra-red (IR) radiation to enhance this effect. The IR radiation would be removed by a filter elsewhere in the system to prevent it from reaching the user's eye.

Note that the display may be back-lit as previously disclosed, or may be illuminated by ambient light rays 401 and/or 402 and/or 403. Such a design, can work with the totally internally reflecting insert 326, or with a partially or fully reflecting mirror surface 325, or with a surface with a dielectric coating. A fraction of the rays 401, 402, and 403 will propagate to the display through the combiner 325. These rays will then be reflected from the display into the optical path leading to the eye. The optical system may be provided with a condensing or collecting lens to gather and concentrate the rays 401, 402, and 403. Additionally, the rays 401, 402, and 403 may be supplied by a lamp mounted optically to the main lens 300 for viewing when insufficient ambient light is available. For the case in which display 320 is a liquid crystal display, insert 326 may comprise a polarizing beam splitter which can act as a polarizer and analyzer for the display. This embodiment may be further improved by adding a crossed rotating system of polarizers as is well known in the art to provide an adjustment in the light level of the ambient scenery. In this way, the light from the display and the ambient scenery light level may be balanced. By using a liquid crystal shutter, the adjustment may be made electronically, and a sensor may be employed for automatic compensation or balance between the relative brightness of the images.

Figure 9:
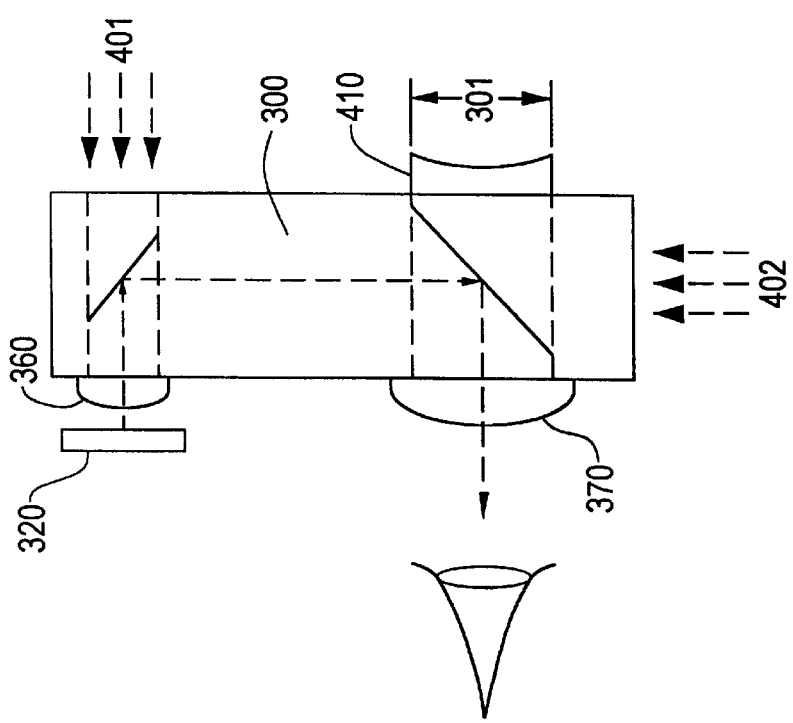
FIG. 9 is a still further embodiment of an image combining lens system of the present invention.

A further improvement to the designs in the foregoing figures can be made by adding a fourth lens 410 on the front of the main lens 300 over the insert, as shown in FIG. 9. The lens 410, being generally of a negative power, counters the positive optical power of the lens 370 so that rays 306 from the ambient scene can be viewed without significant magnification, while rays from the display, which do not pass through lens 410, are viewed with magnification. The lens 410 may have positive or negative optical power depending on the specific vision correction requirements of the user. Other lens surfaces may be added on either side of the main lens 300 to correct the vision of the user, in the manner of ordinary eyeglasses, and any of the microscope lenses may be adjusted in optical power to correct the user's vision. Other lenses may be added to further correct the vision through lenses 370 and 410. Note also that these lenses may also be incorporated substantially within the volume of the main lens 300.

In embodiments in which lenses are provided within a solid main lens 300, such as by injection molding or alternatively by the machining of a set of parts to be assembled into a solid main lens, the index of refraction n and the radius of curvature of the lenses must be corrected from their values in air to obtain the desired optical power, within the potting, molding, or machined medium. The indices of refraction of the compounds and the lens material may be chosen from many compounds having indices in the range of 1.4 to 1.6 for optical polymers or glass, and 1.5 to 2.0 for various other optical materials. The molding compound may be chosen from the many commercial compounds with index of refraction matched to glass (n=1.46), and the lenses may be formed, for example, from $LaSFN_9$ (n=1.85). Alternatively, the optical power may be developed by providing an air gap or vacuum within the molding material or by materials of low refractive index, with the radius of curvature appropriately designed. Another approach is to fill such a gap with a liquid of high or low refractive index. A further alternative is to employ diffractive or holographic lens elements within the main lens 300.

Figure 10:
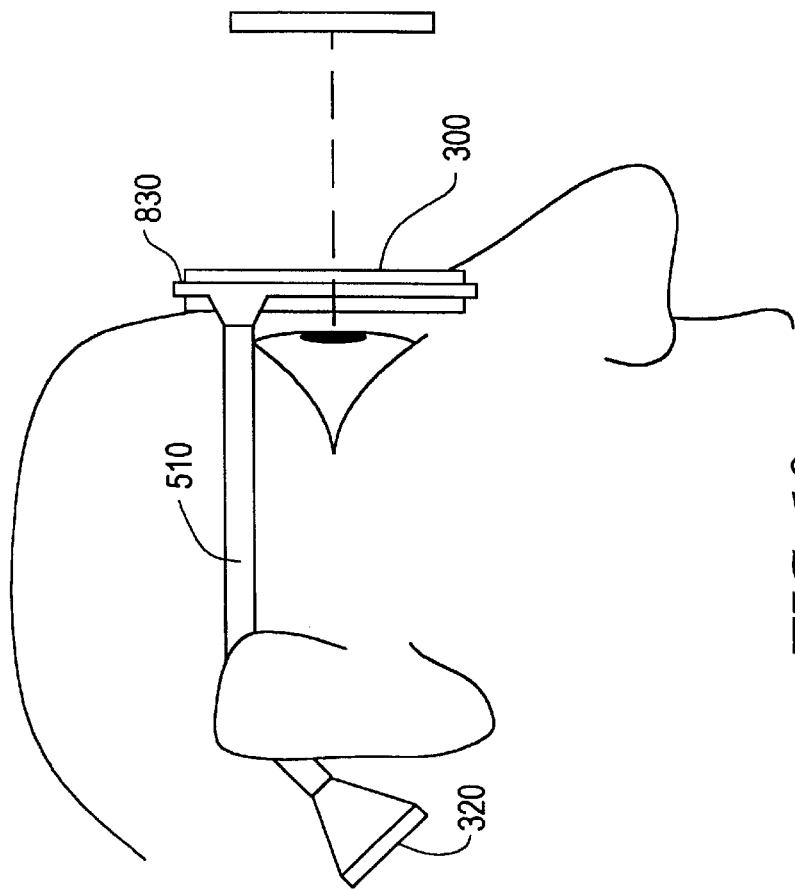
FIG. 10 illustrates an image combining lens system and eyeglass frame with mounted image source and optical path according to the present invention.

In order to balance the weight of the optical system and to remove the display 320 to a position away from the viewer's face, the image may be relayed to the eyeglasses main lens by an image relay 510 which may comprise a coherent optical fiber bundle, or a gradient index (GRIN) lens image conduit, or a relay formed from lenses, illustrated in FIG. 10. In one embodiment, the image relay 510 extends along a side of the eyeglasses, to the display 320. The relay 510 may be formed with predetermined bends in order to provide the image from the display to a precise location on the main lens 300. Alternatively, an additional insert 326 (FIG. 11) in the main lens may be used to accept the image at the desired angle with the desired optical power and to relay the image to the insert 301, as shown in the embodiments of FIGS. 11 and 12.

Figure 11:
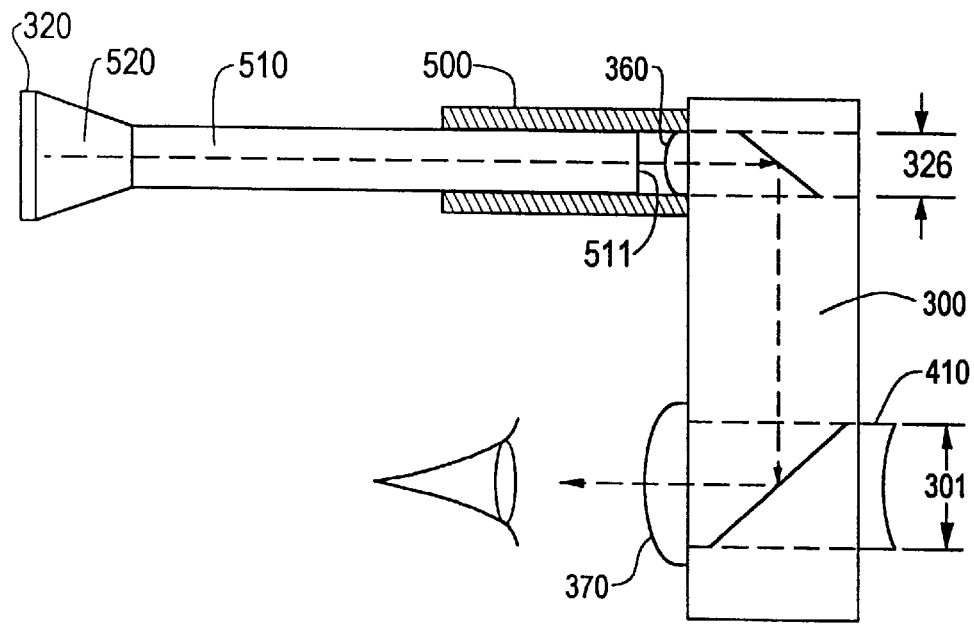
FIG. 11 is a still further embodiment of an image combining lens system in conjunction with an image source and optical path therefrom according to the present invention.

FIG. 11 shows an image conduit 510 which relays images from display 320, through fiber optic taper 520 to lens 360. The purpose of the fiber optic taper is to match the dimensions of the display to the dimensions of the image conduit. For example, the display may comprise a miniature flat panel active matrix electroluminescent display having viewable area dimensions of 15.4 mm by 11.5 mm, and the image conduit may have dimensions of 6.4 mm by 6.4 mm (it being desirable to use conduits with as little weight and cross sectional area as possible); the fiber optic taper reduces the image size by a ratio of 2.4:1. Note that the image conduit relay 510 is positioned within mechanical sleeve 500. This sleeve adds strength to the mechanical joint between relay 510 and the eyeglass lens and frame system, and also provides a degree of focus adjustment by permitting the distance between the end surface 511 of relay 510 and the lens 360 to be varied by the user. Note that the mechanical sleeve may be fitted with threads, friction locks, or other methods known in the art for precise position adjustments.

Figure 12:
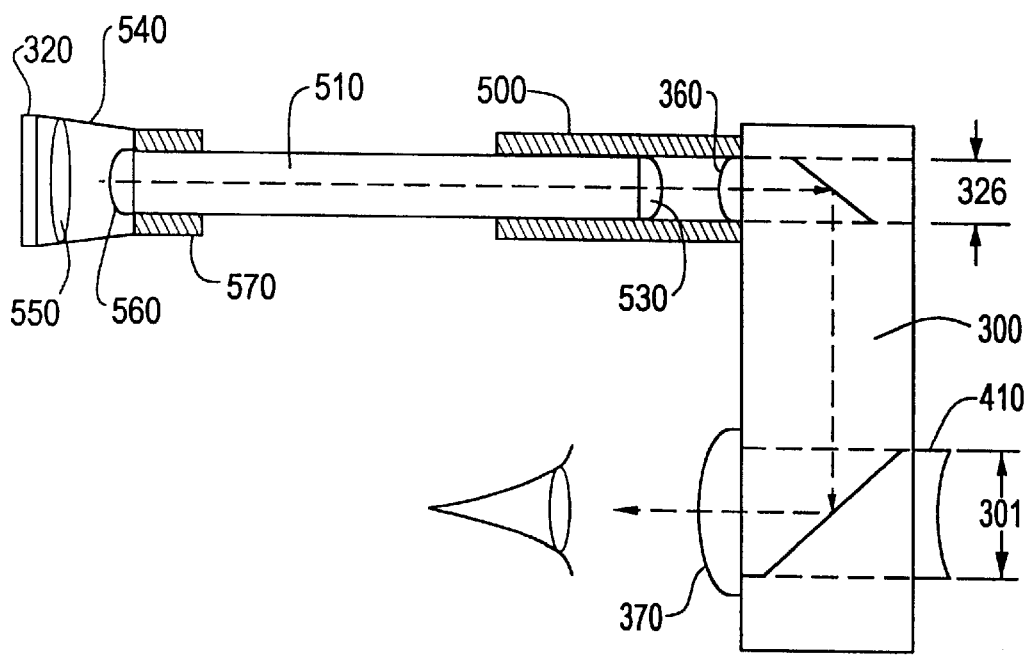
FIG. 12 is a still further embodiment of an image combining lens system in conjunction with an image source and optical path therefrom according to the present invention.

FIG. 12 shows another design in which the image relay is fitted with a lens 530 for further modification of the optical power of the imaging system. Additionally, in this embodiment, the fiber optic taper is replaced by lens 550 which may have positive or negative power mounted in housing 540 and lens 560 mounted to the image conduit (or alternatively mounted to the housing 540). This lens system accomplishes the reduction of image size and further makes possible the adjustment of focus through mechanical sleeve 570 in the manner previously described. The housing 540 may also be provided with means for adjusting the relative positions of the display 320, lenses 550 and 560 and image conduit position.

Figure 13:
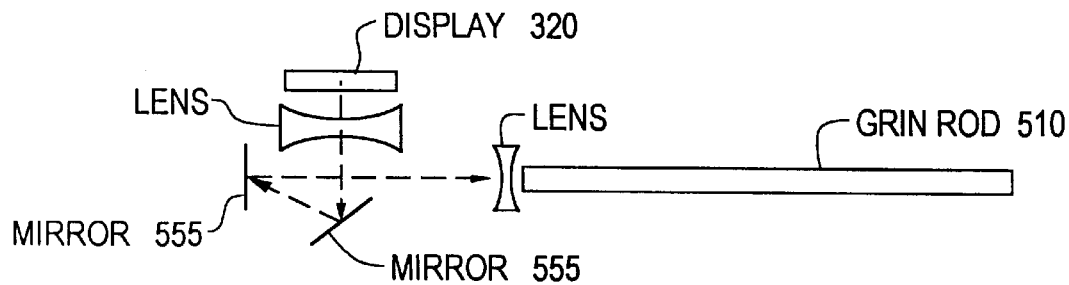
FIG. 13 is a still further embodiment of an image combining system incorporating a folded optical path.

The display may be joined to the GRIN lens relay by a fiber optic taper 520 or a lens 550, as shown in FIG. 12, or a combination of the two. The optical path of the lens system may include mirrors 555 so that the path can be folded and thus reduced in volume, while maintaining a long optical pathlength, as in FIG. 13.

Figure 14:
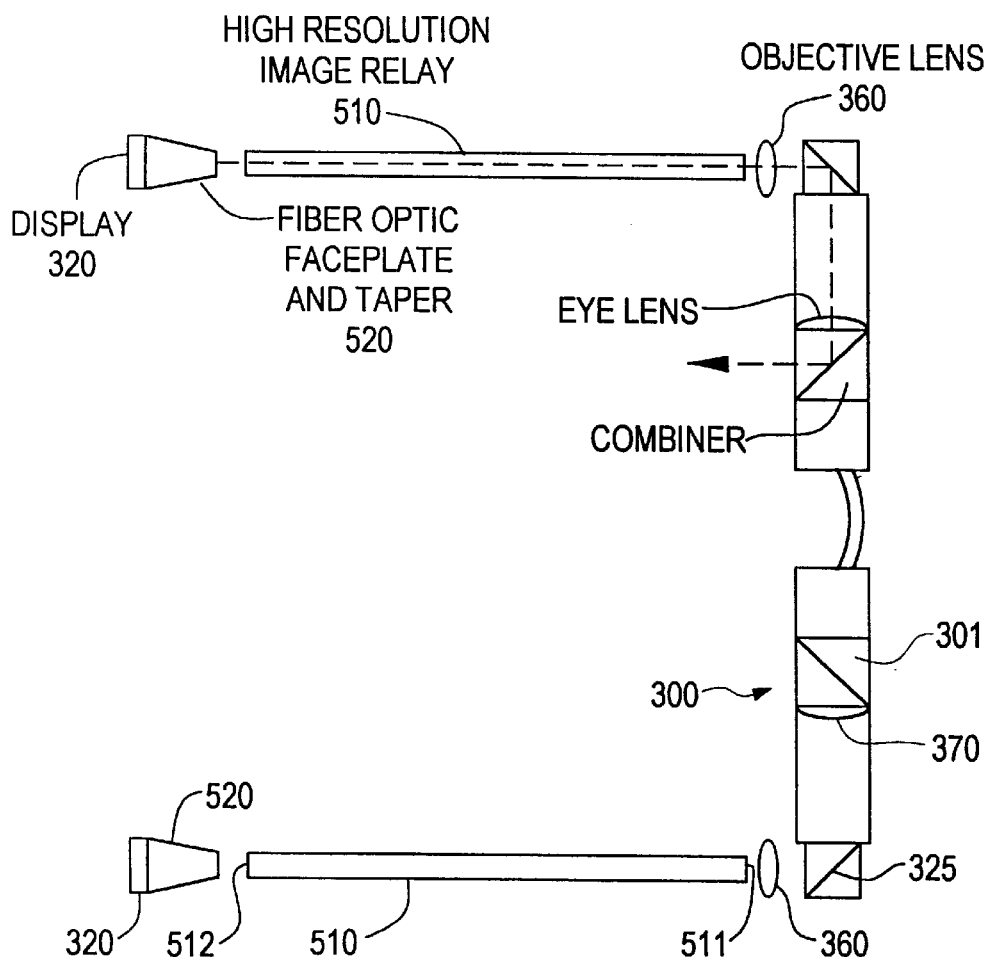
FIG. 14 is a plan view of an image combining system integrating into a pair of eyeglasses according to the present invention.

FIG. 14 illustrates a plan view of a further lens system incorporated into a pair of eyeglasses. This embodiment includes, on each side, an image relay assembly and a basic two-lens compound microscope (objective and eye lens) for magnifying the image and relaying it to the eye through the combiner. Such glasses are capable of displaying binocular stereo imaging.

The image relay assembly comprises a display 320 mounted behind the head and a high resolution image relay 510 comprising a GRIN lens image relay which provides an air image near the exit end 511 at a position termed the GRIN image plane. The exact position of the GRIN image plane depends upon the position of the focal plane at the entrance end 512 (given by the position of the display). Typically, the GRIN image plane is 1 to 3 mm from the surface of the GRIN lens. For the case in which the relay 510 comprises a coherent fiber bundle, the image plane is coincident with the end surface 511.

By selecting the objective lens 360 and the eye lens 370 for the compound microscope and the positions appropriately, the focus, degree of magnification and the collimation distance can be adjusted. As with other embodiments previously is described, lenses 360 and 370 may comprise systems of lenses. The focus of the system can be adjusted by moving the display 320 and taper 520 relative to the GRIN lens entrance end 512, by moving the objective lens 360 relative to the GRIN lens image plane (at the exit) and/or by moving the objective lens relative to the eye lens 370. The objective lens 360 may also be used as a field lens to provide a wide field of view.

In this embodiment, the eye lens 370 is moved to a position within the main lens 300. In this position, the eye lens 370 no longer applies an optical power to rays from the ambient scene. Thus, the lens 410 (FIG. 9) is not necessary in this embodiment. Also in this embodiment, when the eyeglasses are in place on the head, the displays remain behind the head. Placing the displays in back of the head has several key advantages compared to conventional forehead-mounted approaches, including improved center of gravity as well as improved cosmetic appeal. The image is provided to the eyes by the GRIN lens image relay, after which the rays are reflected at 90° by a mirror 325 or prism into the main lens 300. The rays pass sideways through the main lens 300 comprising the eye lens 370 and combiner 301. The eye lens magnifies the image from the relay and provides an image plane at a depth at which the user can focus. The rays are then reflected by 90° again toward the eye by the combiner, thus providing a virtual image at the desired location in front of the glasses, as shown in FIG. 10. The combiner permits see-through operation by mixing the rays from the relay with ambient rays and comprises a surface coated with dielectric layers to provide 50% transmission over the visible wavelength range. Alternatively, the combiner can be replaced by a reflector to make a see-around display with 100% reflection of the displayed image. The eyeglasses can be modified for users needing a prescriptive correction by adding curvature to the surfaces of the main lens 300. Other features, such as image capture or eye tracking, can be added to this basic design.

Figure 15:
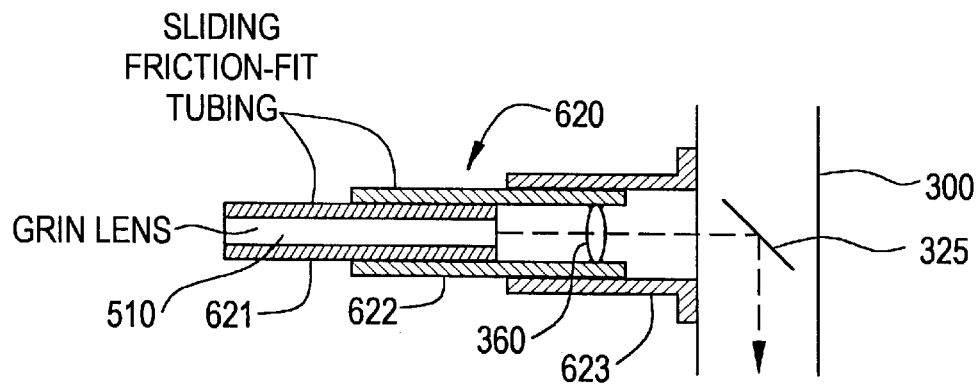
FIG. 15 illustrates a tubing mount for attaching an optical path from an image source to an image combining lens system according to the present invention.

In this embodiment, the diameter of the GRIN lens image relay is less than 3 mm, yet it still provides a transmitted resolution of 200 line pairs per mm (or about 1200 lines). For example, Gradient Lens Corporation's EG-27 is a 2.61 mm diameter rod capable of relaying an 800×600 image in a rectangle with a 2.5 mm diagonal, which is adequate for relaying a VGA image. This high resolution GRIN lens relay was developed for boroscope and endoscope applications. Since the image is reduced by the fiber optic taper 520 for conveyance to the eyes via the image relay 510, a miniature lens system can be used that permits the adjustment of the collimation distance over a relatively large range, as discussed further below. This embodiment is also compatible with prescriptive lenses, which can be bonded to the main lens assembly, and high ambient (see-through) field of view. The GRIN and objective lenses can be mounted in a simple mechanical telescoping tubing mount 620 that permits the positions to be varied and provides focus distance adjustment, shown in FIG. 15. The GRIN lens 510 is mounted within tubing 621 which is frictionally retained but slidable within tubing 622 in which the objective lens 360 is mounted. Tubing 622 is frictionally retained but slidable within tubing 623 fixed to the main lens 300. The tubing mount can also be threaded (FIG. 5B) to be rotatably adjustable. A second adjustment can be made by moving the display with respect to the GRIN lens by a similar mechanism. Both adjustments have the effect of changing the collimation distance, discussed further below.

Figure 16A:
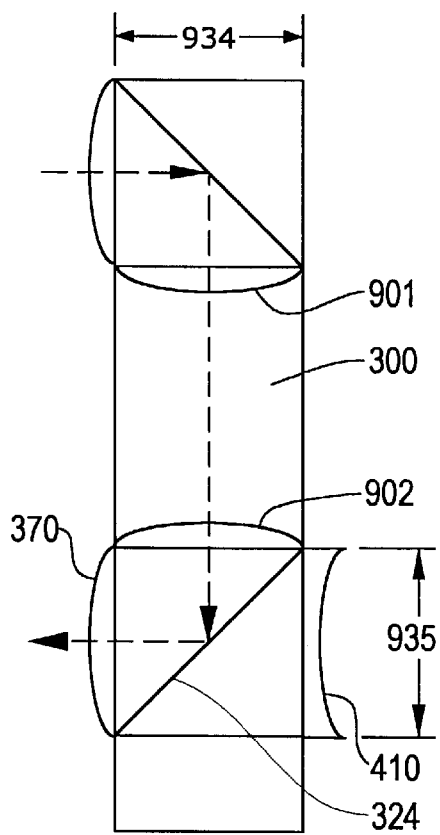
FIG. 16A is a still further embodiment of an image combining lens system of the present invention.

FIG. 16A shows another embodiment in which several field lenses 901, 902 are provided within the main lens 300. Such field lenses have the beneficial effect of distributing the optical power, thus reducing the need for high optical power at the eye lens. Such lenses also can serve to increase the field of view. These lenses and the other optical parts may be formed, for example, by the injection molding or machining of multiple parts, followed by coating of the interior surfaces with metal or dielectric layers, and followed further by the assembly of the parts to form the main lens 300 with embedded optical surfaces.

Referring to FIG. 16A, it should be appreciated that in order to form a main lens 300 well-suited for incorporation in an eyeglass frame, it is desirable to maintain the thickness 934 of the main lens 300 within the range of conventional eyewear (less than 25 mm and preferably in the range of 1 mm to 15 mm). The surfaces of main lens 300 form an aperture stop in the internal optical path which is of a dimension equal to the thickness 934. The partially reflective interface 324 also forms a stop. Depending on the magnification of the lenses, these stops may restrict the field of view of the image from the display. This invention overcomes some of the limitations of these stops by using field lenses 901, 902.

Figure 16B:
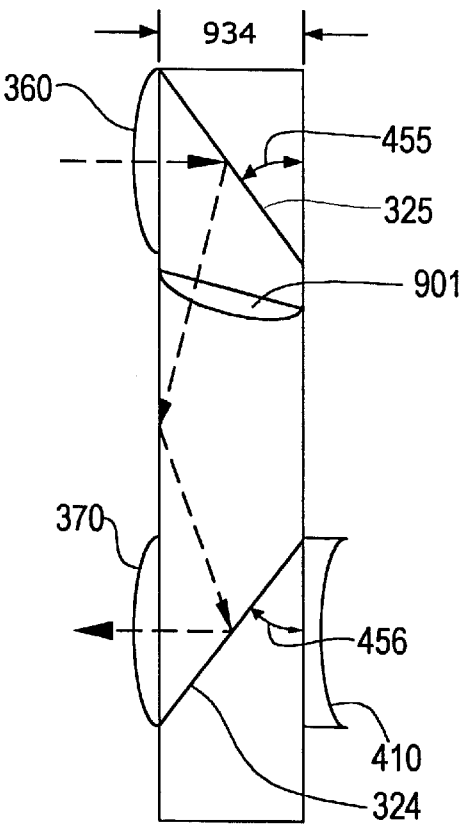
FIG. 16B is a still further embodiment of an image combining lens system of the present invention.

A second method of overcoming the stop introduced by the main lens 300 thickness 934 is shown in FIG. 16B. The interfaces 324, 325 are set at angles 455 and 456 less than 45° so that the thickness 934 of the main lens 300 may be reduced. The optical path requires one or more reflections from the interior surfaces of main lens 300, which occur by total internal reflection as previously discussed. In such a case, embedded lenses 901 are canted appropriately, as shown in the figure.

It may be seen that the above optical system has application in see-around, see-through, or full-immersion systems. Various devices may be added to change the design from one type to another, or to permit the automatic changeover in system type. For example, lens 410 (FIG. 11) may be changed to an opaque disc to convert the see-through system to a see-around system. Alternatively, the insert 301 may be increased in extent to a large field of view, and the front surface of the main lens 300 may be provided with an opaque cover to form a full immersion system. Any of the opaque covers may be replaced by a liquid crystal shutter that can be electronically adjusted to reduce the light level of the ambient scenery or to block it out entirely Photochromic materials may also be applied to control ambient light.

Additionally, a prism or mirror may be used to form the insert 301. Such a device is no longer a combiner, but rather is a simple reflector which is all that is needed in a see-around system. This has an advantage over other reflector systems, because the reflecting surface is provided within the main lens 300 and therefore has safety and durability advantages over other approaches.

A further manner of forming the image combiner uses binary optics to form a diffractive optical element having a binary surface structure formed in a surface characterized in the simplest case by an angle 310 (FIG. 3) with respect to the base of the main lens 300. The advantage of a diffractive optical element is that the angle 310 may be made large while still directing light through lens 340, whereas at a reflective surface the angles are fixed by the law of reflection. This permits the field of view through lens 340 to be large, while also permitting the thickness of the main lens 300 to remain relatively small. Lens 340 and other lenses may also comprise diffractive optical elements. A disadvantage may be undesirable wavelength-dependent effects that could be present in a color system. However, the flexibility inherent in the optical design of the complete system described above, such as the ease of insertion of counterbalancing diffractive optical elements elsewhere in the optical path, makes possible the compensation for chromatic effects, if any.

The insert 301 may be replaced with a holographic combiner by placing a hologram at surface 324 (FIGS. 16A or 16B) In such a case and similar to the diffractive optical element, the combiner is designed to work with one or more principal wavelengths emitted by the display. As with diffractive combiners, the holographic combiner can add optical power and can permit the combiner surface to be placed at a wider range of angles than the reflective combiner.

The lenses described in the various embodiments may be selected to form achromats to remove chromatic aberrations inherent in the various parts of the lens system. It may also be seen that features of the various embodiments may be combined. Additionally, although the figures show singlet lenses, any of the lenses may be replaced by combinations of multiple lenses or surfaces designed to reduce distortion, improve field flatness or add other improvements to the resultant image seen by the user.

Figure 17:
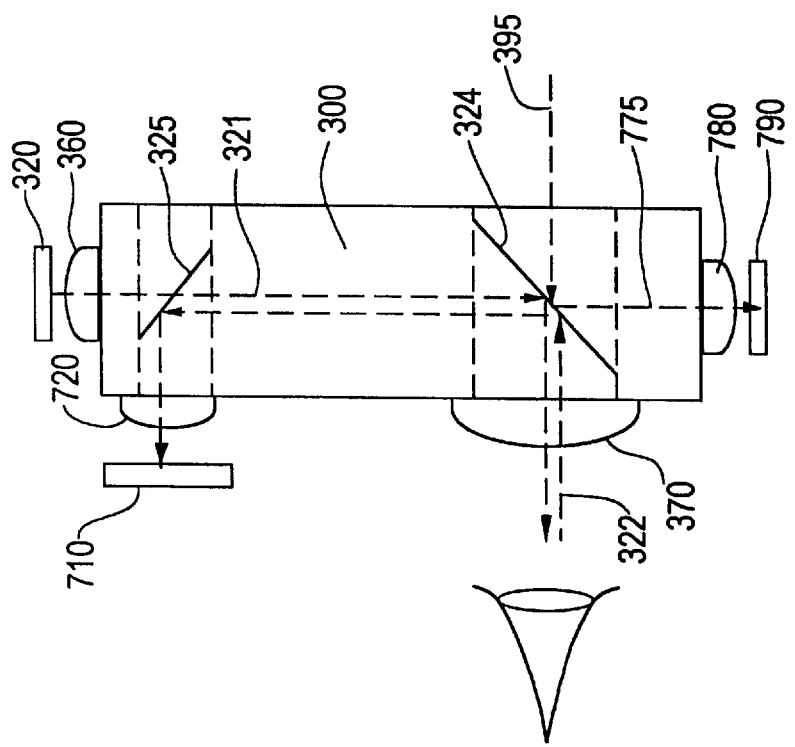
FIG. 17 is a still further embodiment of an image combining system in conjunction with image acquisition and eye tracking according to the present invention.

FIG. 17 illustrates another application of the lens system that may be used for image acquisition and eye tracking. In this embodiment, rays 321 from display 320 pass through lenses 360, 300, and 370 to the eye, as previously described. Rays reflected from the eye 322 travel backward along the optical path to the beam splitting interface 325 which directs the light through lens 720 to sensor 710. Sensor 710 may comprise a CCD or CMOS sensor array as is commonly employed for image acquisition, or an alternate type of image detector. The image of the eye thus collected can be used to determine the position of the user's eye and in this way the location of the user's gaze. Use of eye tracking is advantageous in certain systems for two reasons. First, eye tracking permits a reduction in the total number of display pixels needed, since, if the location of the fovea is known, a high resolution image need only be displayed in that region. Furthermore, eye tracking can be used to increase the exit pupil of the display. More specifically, the exit pupil of the display can be moved to the optimal location in response to detection of a change in the position of the user's pupil. Eye tracking is also useful for many other applications involving specific system functions.

The embodiment in FIG. 17 also has a provision for collection of imagery from the user's gaze. Rays 395 from the ambient scene are partially reflected by interface 324 along a path represented by ray 775 to a lens 780 and image detector 790. The display and sensors may operate sequentially if it is necessary to avoid projecting the displayed image into the sensors. It may be seen that many combinations of displays and detectors may be integrated with this system to provide eyeglasses vision correction, display of information, collection of eye tracking imagery, or collection of ambient scenery, including visible and infra-red images.

As an example of the use of the invention for the formation of a computer display within eyeglasses, consider the creation of a computer screen to be viewed at a distance of 67 cm from the eye. If the height of the desired image is 28 cm, and the image produced at the output 511 of relay 510 is 2.1 mm in height, we require a set of lenses 360 and 370 that produce a magnification of 133. This magnification can be obtained by a lens 360 having, for example, a focal length of 12 mm, and a lens 370 having a focal length of 18 mm. The lens 360 is placed 15.39 mm from the image produced by relay 510. The lens 370 is placed 72 mm distant from the lens 360. This produces a virtual image 67 mm distant from the eye. The rays are divergent. By changing the positions of the lenses, the image can be formed at infinity or elsewhere depending on the relative position of the lenses. This calculation has been made for the case in which the space between the lenses comprises air. If a material of index n>1 is used, for example, in a solid embodiment of the main lens 300, the distances are adjusted accordingly.

Figure 18:
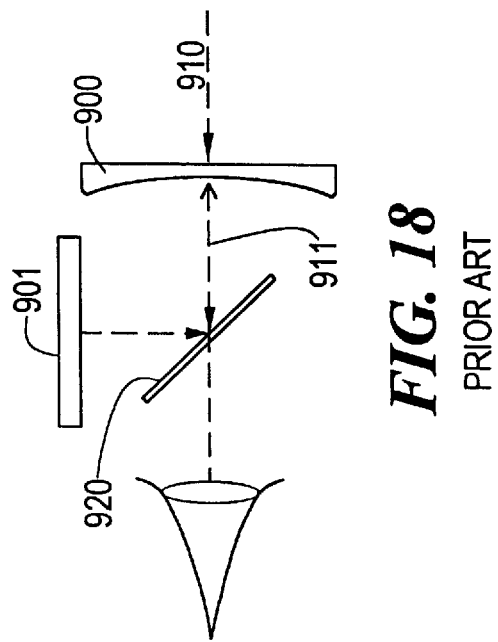
FIG. 18 is a prior art catadioptric display based on a free-space combiner.

FIG. 18 shows a prior art catadioptric design based on a free space combiner in which the image generated by the display 901 is reflected by a plane partially-transmissive mirror or dielectric coated surface 920 toward a curved mirror or coated reflecting element 900 which reflects the light back toward the eye. If the element 900 has curvature, the vergence of the light reflected from it is changed, which permits the eye to perceive a virtual image in space at a comfortable distance in front of the eye. This element 900 serves the same function optically as the lens 370 in FIG. 8. Light passing through the element 900, such as rays 910 from the ambient scene, passes without any change in its vergence. Thus, the scene as depicted by rays 910 can be viewed unimpeded in vergence by the optical power of the display viewing optics. The element 900 does introduce absorption and therefore the rays 910 having passed surface 900 are attenuated.

Figure 19B:
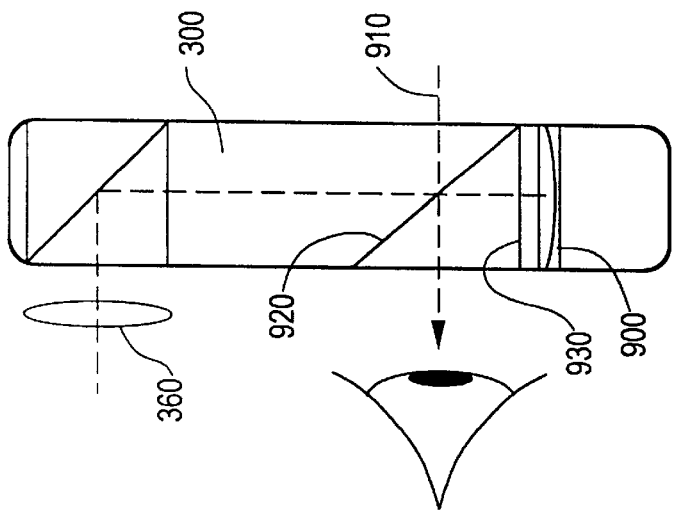
FIG. 19B is a further embodiment of a catadioptric system of the present invention.
Figure 19A:
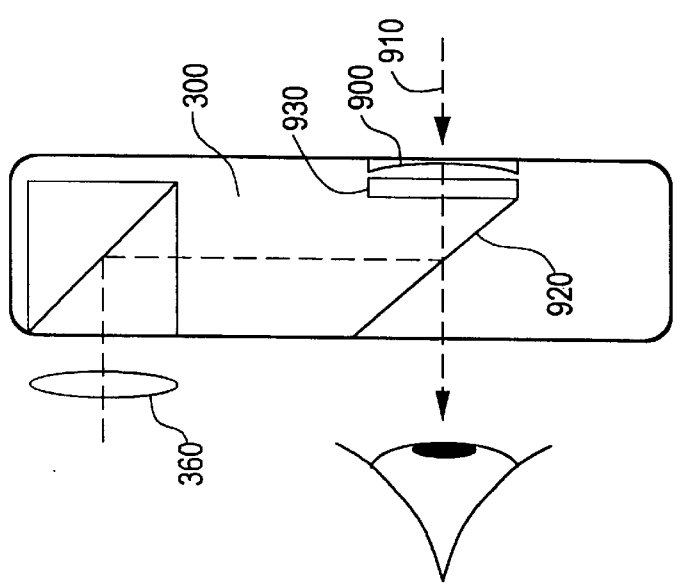
FIG. 19A is a catadioptric system of the present invention.

An improved system using the method of the present invention is shown in FIG. 19A. The element 900 is reduced in size and brought within the main lens 300. The combiner 920 may comprise a half-silvered mirror or beam splitter cube as previously described, or it may comprise a polarizing beam splitter. For the case of a polarizing beam splitter, a large fraction of light which is polarized in the proper axis is reflected toward the element 900. In passing twice through a quarter wave plate or other polarization rotator 930, a rotation of the axis is effected so that the ray passes efficiently through the polarizing beam splitter to the eye. Optical coatings known in the art of interference filters may be used on the combiner 920 and on the element 900 to yield efficient passage of ambient rays and display imagery. For example, if the display image is composed of three colors (red, green and blue) comprising narrow spectral bands from a laser source, the optical coatings may be configured for high reflectivity for these narrow wavelength ranges at the surface of element 900, while rays 910 passing through the element are impeded only in these narrow ranges and thus the image is seen largely free of color distortion. FIG. 19B shows an alternate embodiment of the same nature, with polarizations and element 900 oriented so that rays 910 are unimpeded by mirror 900.

Prior art head mounted displays are limited to a single collimation distance (the distance at which the image is perceived based on focus). Often in stereo head mounted displays, this distance is in conflict with the distance perceived from the vergence of the eyes. The invention overcomes this problem by permitting the display of multiple images at different collimation distances.

Figure 20:
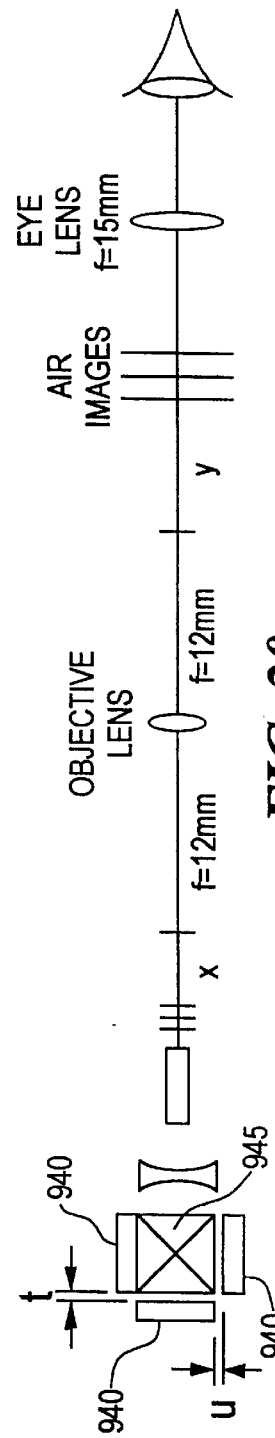
FIG. 20 is an image combining system incorporating multiple collimation distances according to the present invention.

A multiple collimation distance display fuses the images from two or more display sources to provide the user with background and foreground images at different focal distances. Let the distance between the GRIN rod image and the objective lens be given by x (FIG. 20). In FIG. 20, there are three displays at three distinct distances from the GRIN lens, leading to three values of x and three values of y, one for each display. If x is adjusted by a small amount, the collimation distance is changed by a large amount. The table below shows a calculation of collimation distance as a function of distance from the objective for one optical design.

| Distance from Display Image to Objective (mm) | Collimation Distance (mm) |
| --- | --- |
| 15.245 | 127.9 |
| 15.280 | 163.8 |
| 15.315 | 221.3 |
| 15.350 | 328.5 |
| 15.385 | 598.4 |
| 15.420 | 2568.6 |
| 15.425 | 4691.6 |
| 15.431 | 254887.8 |

This table shows that a change of 186 $\mu$m in the distance between the image and the objective lens yields a change in collimation distance of from 12.7 cm to 254M (essentially infinity), for the particular optical design for which the calculation was made. If two or more displays 940 are employed and joined through a combiner cube 945 (as is commonly done when joining red, green, and blue images in LCD projectors) and if the displays are set at different distances (illustrated as 0 mm, t, and u in FIG. 20) from the GRIN image relay, the user will have to focus in different planes to see the images (just as the eye does when viewing real images), as shown in FIG. 20. The differences in distance can be obtained by interposing thin layers of glass between the cube and the displays.

Importantly, the image generated can now have three separate simultaneous planes corresponding to foreground, mid, and background. This effectively removes the problem of collimation distance and eye vergence disparity from the hardware. Optical techniques exist to create as many planes as needed (or as many as practical in a head-mounted system).

Figure 21:
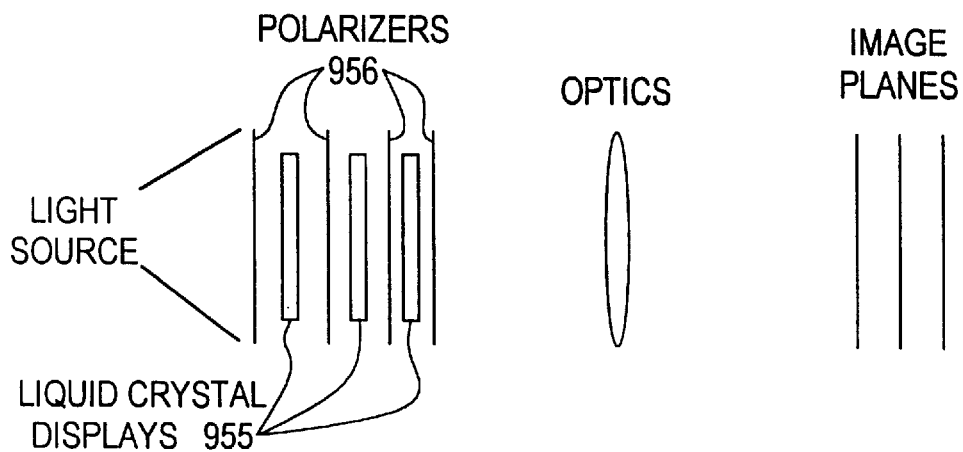
FIG. 21 is a further embodiment of an image combining system incorporating multiple collimation distances according to the present invention.

In an alternative approach, a dithering mechanism moves the objective lens to the desired position. Such an approach could be synchronized with a flat panel display running at 180 frames per second to provide three separate image planes. Note that the required lens translation was shown earlier to be only 186 $\mu$m. Another approach comprises stacking in the manner of FIG. 21, which has been used for subtractive color LCDs. In the subtractive color display system, three displays 955 are stacked and each display removes one color from the final image. The displays may be separated by polarizers 956. In this invention, color displays can be used to provide an image characterized by multiple image planes at various collimation depths, depending on the spacing of the displays.

It should be noted that in a subtractive color display, the variation in collimation distance between planes is considered a detrimental artifact. In this invention, however, the variation in collimation depth can be used to provide an improved image. A further advantage may be possible by using a low resolution display for the background, to reduce system cost.

In scanned approaches in which a mirror or waveguide is used to scan a single pixel, the adjustable collimation distance may be attained in several ways. The first comprises the use of several pixels at different distances from the entrance pupil of the beam scanning system. This approach can be attained by using several optical fibers each of which is displaced from the entrance pupil by a fixed different amount, leading to a different collimation distance for each fiber. The photons intended to be displayed are then routed over the fiber corresponding to the desired collimation distance.

A second method comprises the use of micro-mechanical mirrors to adjust the path length from a single fiber to the objective. By adjusting the distance, the collimation distance can be set for each pixel. The optical distance may be adjusted by passing the light rays through a medium having an index of refraction that can be altered by an external force.

Figure 22:
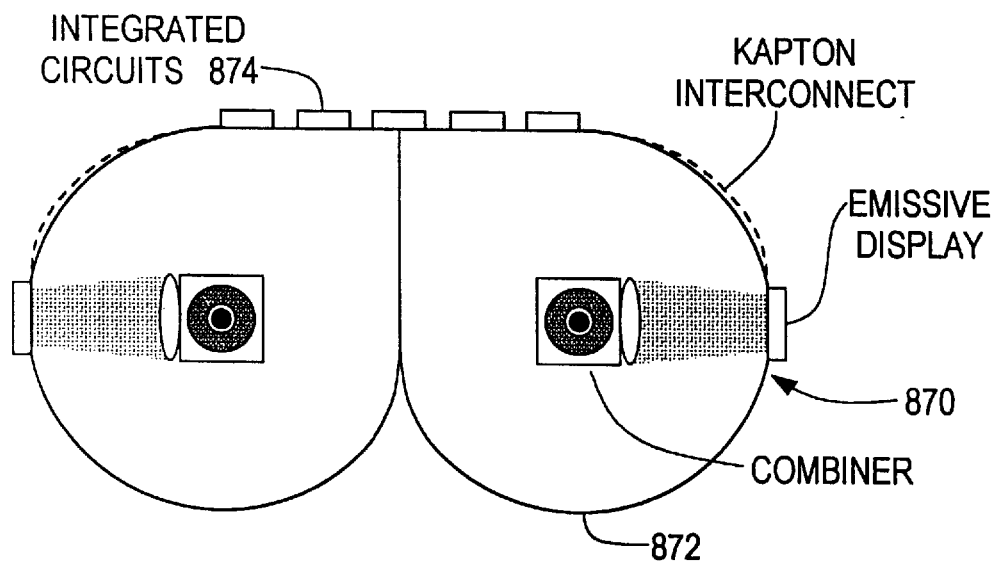
FIG. 22 is a face mask structure with integrated image combining system and computer circuits according to the present invention.

Although the foregoing discussion has focused mainly on the application of the optics in eyeglass form, the optics may also be applied in full face mask systems such as a diver's mask, a firefighter's face shield, an astronaut's space suit mask, a hazardous material body suit face mask, or the like. FIG. 22 shows an example of the integration of the optical system 870, a face mask structure 872, and computer circuits 874 to form a completely integrated computer within a face mask system. This is possible in systems in which the face mask provides sufficient area at the edge for integrated circuit mounting. As the size of integrated circuits decreases, it will become possible to mount displays and circuits in this way on eyeglasses. The display can be mounted directly to the edge of the lens, as indicated in FIG. 22. For diving masks, circuitry and displays can also be potted within the face mask at its edge to yield hermetic protection from water.

FIG. 22 shows two displays, which allow generation of a stereo image. The combiners can be located directly within the ordinary field of view or can be located out of the ordinary field of view (as shown) such that, to see the display, the user must look up, down, or to the side, to wherever the optical system has been placed. Suitable displays for a face mask are active matrix electroluminescent displays or active matrix liquid crystal displays, which are commercially available.

Figure 23:
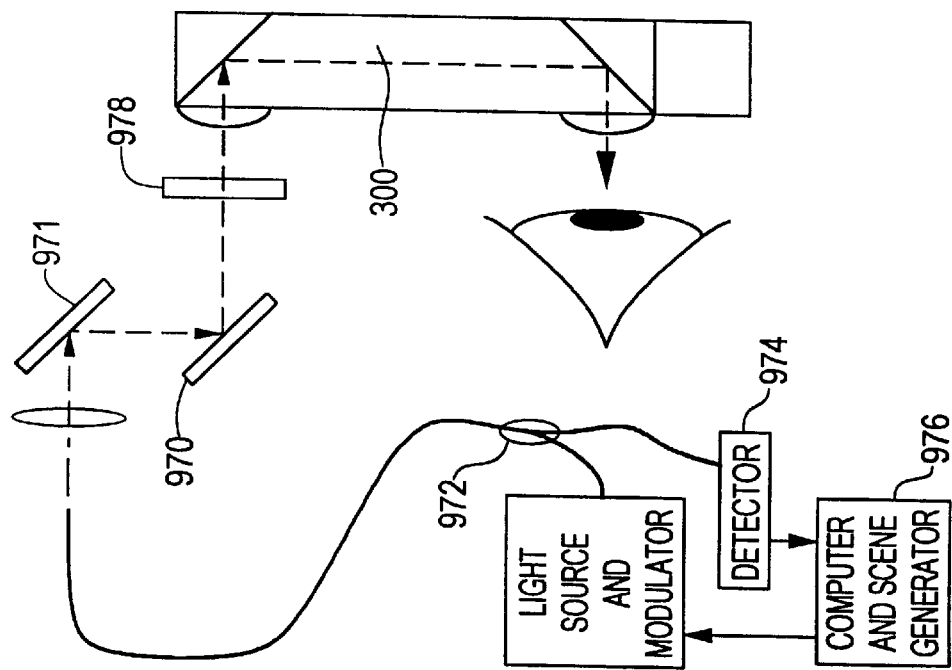
FIG. 23 is a image combining system in conjunction with scanning mirrors for eye tracking according to the present invention.

Referring to FIG. 23, a beam scanning device is provided that creates a highly miniaturized image plane on a surface that by use of lenses and folded, embedded optics as previously described, is directed to the user's eye. The image plane is formed by scanning the light from an optical fiber over the points defining the miniaturized plane 978. Since this scanned pixel can comprise a diffraction-limited spot, the image plane can be extremely small. The scanned pixel is synchronized with grey-level and/or color data delivered over the fiber, so that each point on the miniature image plane is painted with the appropriate photon stream, to produce the desired image at the screen. The optical data delivered to the scanner by fiber is generated within a computer and so the graphics circuit must drive a set of optical sources (such as lasers) that produce the desired combination of red, green and blue at the desired intensity.

The beam scanner can be formed by microelectromechanical silicon machining (MEMS). The most direct way to form the scanning system is by fabricating horizontal and vertical mirrors 970, 971 that are used to steer the photons to the desired point, as shown in FIG. 23. The vertical and horizontal scanning mirrors are formed in close proximity to limit complexity of the relay optics. The vertical scanning mirror 971 can oscillate at 60 Hz for conventional frame rates. A micromachined wave guide may also be fabricated.

A beam steering device can be formed with optical fibers. The difficulty with such devices, however, is that one is constrained to the mechanical properties of the available optical fiber. In contrast, an advantage of a micromachined scanner according to the present invention is that thin films may be used to tailor the mechanical resonant frequencies and waveguide geometries in designs that may be unattainable with fused silica fibers.

The MEMS-based scanner described above is also operable as an image collection device. In a head mounted display application, the imaging optics can be used to transmit a return image of the eye that can be used for eye tracking. In the case of an eye tracker integrated with a MEMS display, the display optics, including the scanning system, can be used for both the display of the image and the collection of an image of the eye, which can be returned from the system to a detector, as indicated in FIG. 23.

The delivery of photons to the eye has a reciprocal optical process, in which axial reflections from the retina return along the same optical path, if the system is in axial alignment. By locating the set of mirror positions which maximize the return signal, the angular position of the retina and hence the direction of gaze can be determined.

The strength of the return signal can be increased in a number of ways. In a MEMS approach, red, green, and blue wavelengths may be combined along the optical path to form a color display. Additionally, infrared (IR) wavelengths may be added as a fourth band that is not perceived by the user. In this way, an infrared pattern may be painted in the eye, and by detection of the returned pattern, the position of the eye may be determined.

FIG. 23 illustrates how such a device operates. Visible and IR light rays are transmitted synchronously to the scanning mirrors 970, 971 to project an image into the eyeglasses optical system, and from there into the eye. If the eye is at the exit pupil in correct alignment, a return signal is reflected into the optical path. The return (reflected) signal propagates to the coupler 972 and from there to the detector 974. If the illumination light is constant (blank screen), then the reflected stream of pixels is in fact a pixelated image of the eye which can be reformed by the computer 976 into an image of the eye. If however, the illumination light is an image itself, then the reflected stream of pixels comprises a convolution of the original image and the reflected image. In this case as well, the computer can deconvolve the images (since the image sent to the eye is known) and create an image of the eye. Another method is to use modulated visible light for the image sent to the eye, and constant IR to illuminate the eye so as to create a return IR image. All of these methods result in the creation of an image of the retina from which the direction of gaze can be determined.

Figure 24:
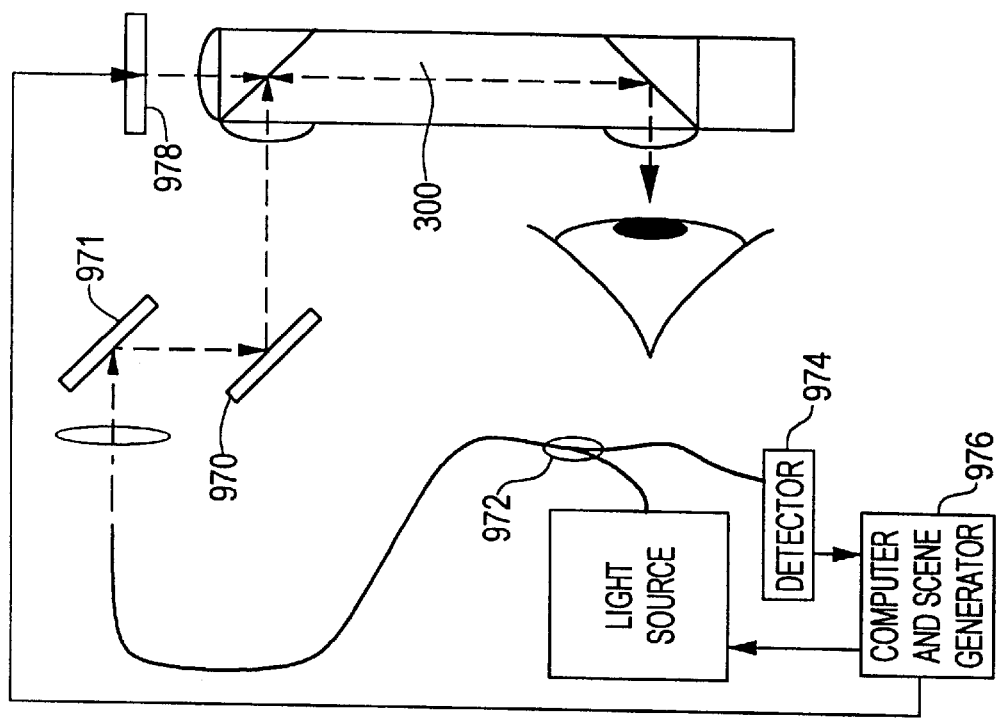
FIG. 24 is an image combining system in conjunction with scanning mirrors and a flat panel display for eye tracking.

The system shown in FIG. 23 can also be used with a standard flat panel approach to eyeglasses or head mounted display design, as shown in FIG. 24. In such a case, the MEMS system collects an image of the eye only and is not used to form the display image. The display image is provided through a combiner by a flat panel display.

Figure 25B:
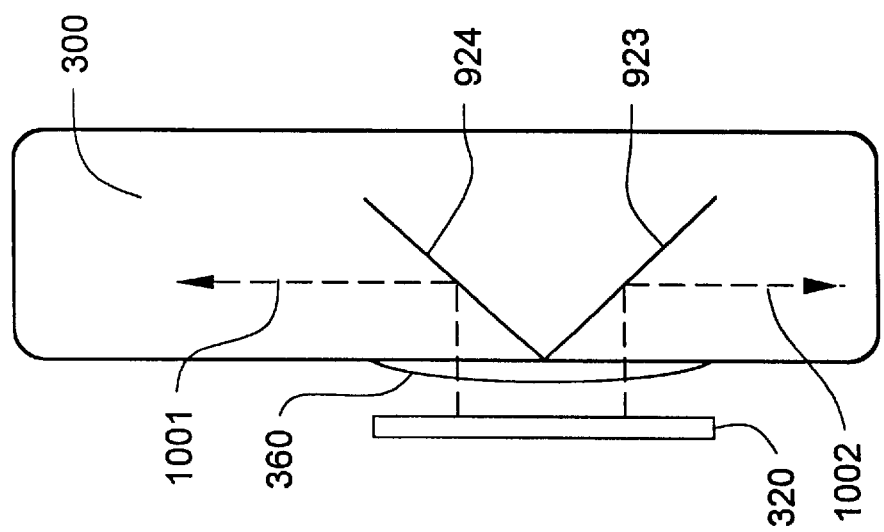
FIG. 25B is the embodiment of FIG. 25A illustrating the dividing of light onto two paths.
Figure 25A:
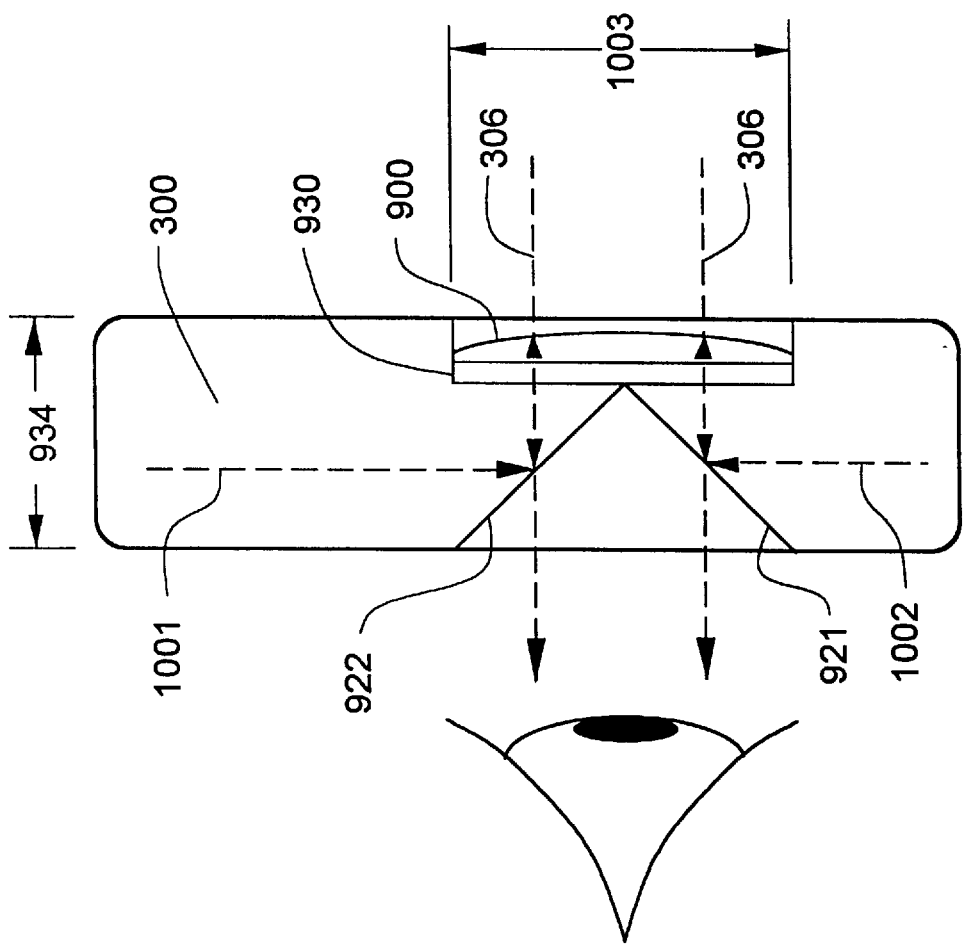
FIG. 25A is a further embodiment of an image combining lens system having increased field of view according to the present invention.

FIGS. 25A and 25B show a further embodiment in which the field of view can be increased without substantially increasing the thickness 934 of the main lens 300. The field of view is increased by attaining an increase in the width 1003 of the aperture stop introduced by the combiner interfaces (324 in FIG. 16), as previously described.

FIG. 25A shows the use of two combining interfaces, 922, 921 which receive light from opposite optical paths 1001 and 1002. Note that a single interface and single path were shown in the catadioptric approach illustrated in FIG. 19; this embodiment uses two such paths combined to provide a doubling in the size of the aperture stop 1003.

Figure 26:
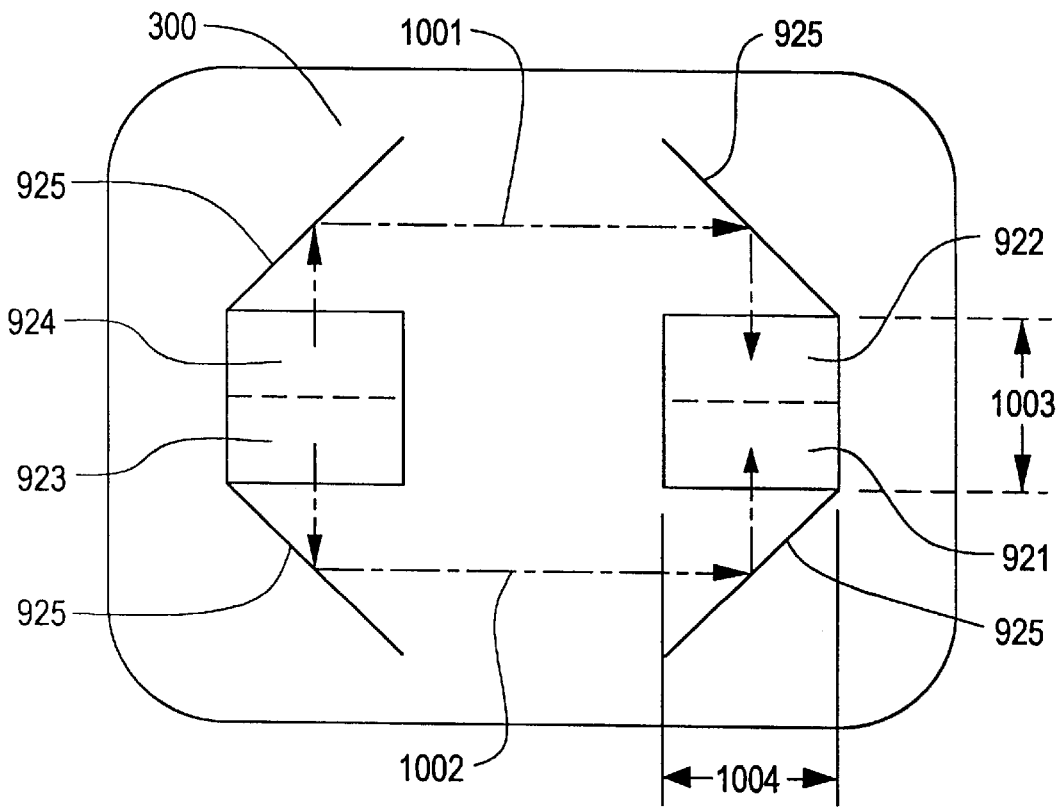
FIG. 26 is a plan view of the image combining lens system of FIG. 25.

FIG. 25B illustrates how light is divided up into two paths 1001 and 1002. In this particular embodiment, the display 320 and lens 360 provide rays to reflective interfaces 923, 924, thus splitting the rays into the two paths 1001 and 1002 in a manner symmetric with the recombining interfaces 921, 922. FIG. 26 illustrates in plan view the main lens 300. Light enters the main lens 300 and is reflected by interfaces 923, 924 along the two paths. Four embedded mirrors 925 within the main lens 300 reflect the light to surfaces 921, 922. The embedded mirrors 925 are formed with their reflective interfaces approximately orthogonal to the surfaces of the main lens 300 and therefore approximately parallel to rays from the ambient scene transmitted through the main lens 300 to the user's eye. Therefore, mirrors 925 have minimal effect on sight through the main lens 300. Further, the interfaces 921, 922, 923, 924 may comprise dielectric coatings designed to reflect the particular range of wavelengths emitted by the display 320, and not others, and in this way stray reflections within the main lens 300 may be reduced.

A specific example of the embodiment in FIGS. 25A and 25B comprises a combiner formed from two perpendicular surfaces 921 and 922 formed from the sides of a right angle prism. Rays 1001 from the top and rays 1002 from the bottom combine with external rays 306 as previously described to form the image, thus doubling the maximum field of view of the displayed image, without increasing the thickness of the main lens 300. In this way, the height 1003 of the combiner can be made twice the thickness of the main lens 300 while still preserving the required angles, which for a beam splitter cube are 45° angles. In this embodiment, the image must be provided to the combining system from two paths, as shown in plan view in FIG. 26. The rays that form the image enter the main lens 300 through the surfaces 923 and 924, which are also configured to form perpendicular surfaces. These surfaces split the incoming rays into two paths. Rays entering through the lower surface 923 take the path indicated by ray 1002. Rays entering through the upper surface take the path indicated by ray 1001. Four mirrors 925 fold the optical path so that the entire arrangement may be placed within the main lens 300. These examples show the use of this mirror system with catadioptric lenses, but the other embodiments discussed previously can also be used.

A further improvement can be made by locating image planes in the optical design so as not to occur upon a plane that includes the vertex of the surfaces 921 and 922 and the vertex of the surfaces 923 and 924. In this way, artifacts in the final image resulting from the splitting of the rays can be minimized. One method to accomplish this is to place the lenses needed in the optical system (such as 360 and 370, for example, or mirror 900) near these surfaces so as to form images in other planes.

This invention is not limited to square combiners and no limitation in combiner width 1004 is imposed by any of the foregoing improvements. The aspect ratio of the field of view may be altered simply by widening the interfaces 920 and 921 as needed.

Figure 27:
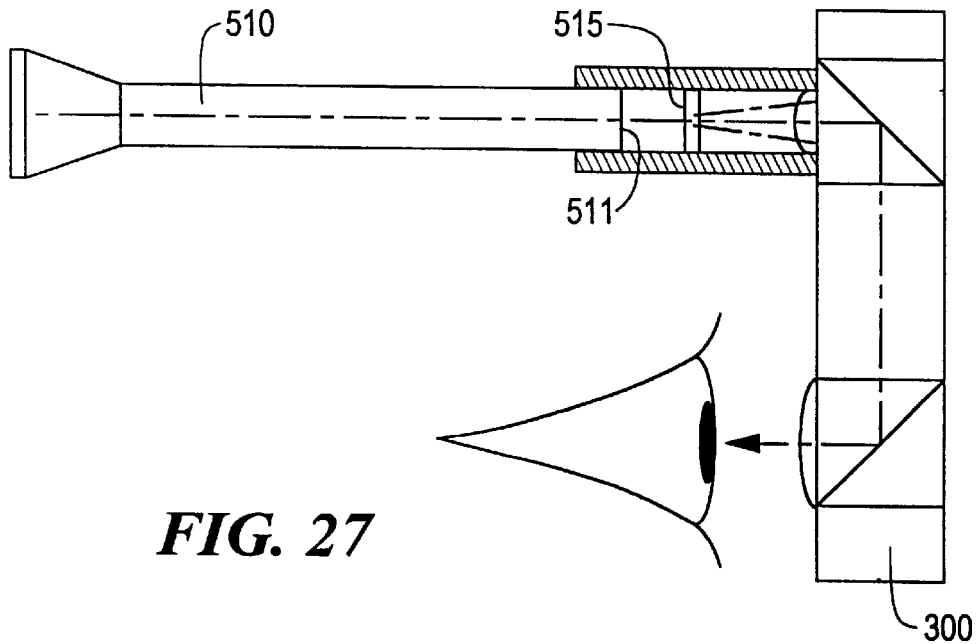
FIG. 27 is a further embodiment of an image combining lens system in conjunction with an optical path and image source having increased field of view according to the present invention.

FIG. 27 shows an embodiment in which the field of view of rays emanating from the optical relay 510 is increased by insertion of an optical element 515 comprising, for example, a diffusing screen, a microlens array, a fiberoptic faceplate, or a diffractive optical element. The element 515 is positioned with respect to the surface 511 to coincide with an image plane, so as to form an image on the element 515. For the case in which relay 510 is a coherent fiber bundle, the element 515 may be bonded directly to the end surface 511 or etched into the end surface. For the case in which the relay 510 is a GRIN image relay, the element 515 is placed at the location of the image produced by the relay 510. If the relay 510 comprises lenses, the element 515 is placed at a focal plane of the lens system. In this way, the element 515 increases the field of view of the pixels by one or more of the mechanisms of diffusion, refraction, or diffraction as the case may be for the type of element or combinations used. The result of using such a screen is an increase in the field of view in the image as seen by the user. For the case in which optical element 515 is a fiberoptic faceplate, one or both surfaces of the faceplate may be curved to improve field-flatness of the displayed image.

Figure 28A:
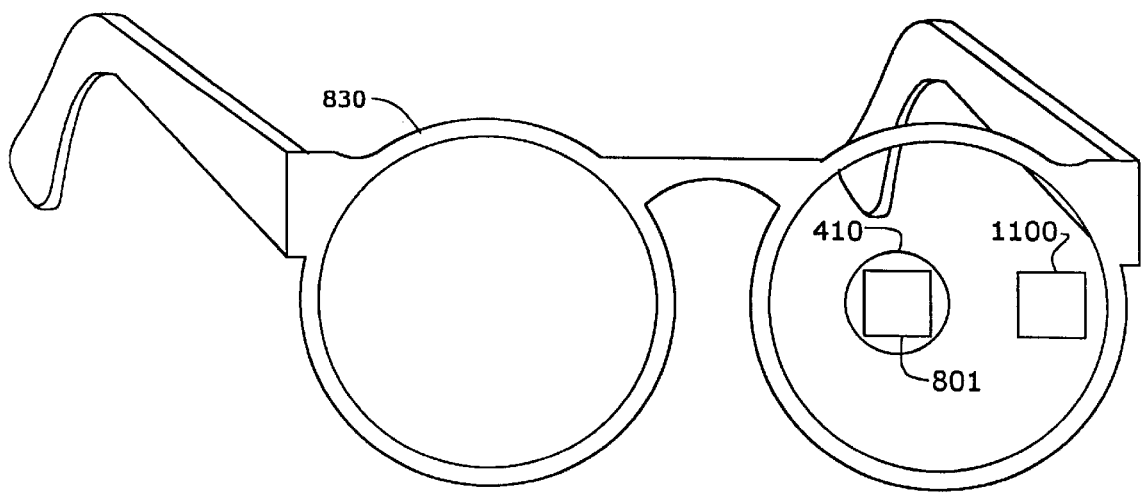
FIG. 28A is a schematic perspective view of a pair of eyeglasses built according to the present invention.
Figure 28B:
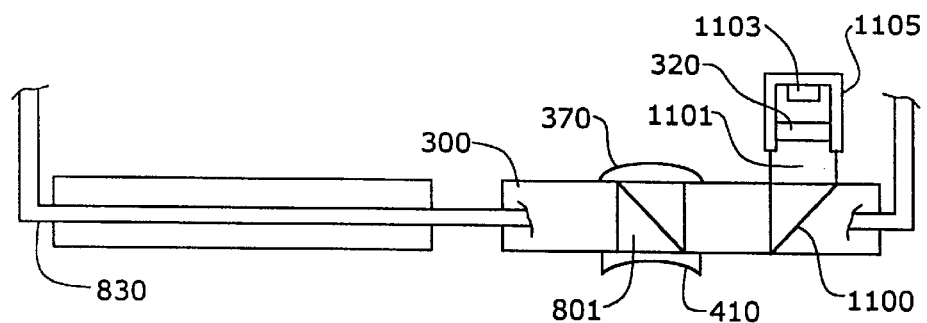
FIG. 28B is a top plan view, partially cut away, of the eyeglasses of FIG. 28A.

Eyeglasses displays have been built in accordance with the invention described herein, indicated in FIGS. 28A and 28B. In this embodiment, the main lens 300 is housed in a commercial eyeglass frame 830. The main lens 300 comprises an embedded polarizing beam splitting cube 801 and an embedded prism 1100 which serve to reflect light from the active matrix liquid crystal display 320. The display is lit by backlight 1103 and the display and light are contained in housing 1105. The display is connected electrically to electronic circuits (not shown in FIGS. 28A or 28B). The display 320 is mounted optically to spacer 1101 so that the index of refraction of the medium between the display and the surface of lens 370 is relatively well-matched to minimize internal reflections, the indices of refraction of the materials being in the range of 1.4 to 1.6. The display 320 is positioned so that the polarization of light emitted by the display is in a favorable direction for reflection by cube 801 toward the eye, with minimal transmission through the cube's interface. Lens 370, a singlet plano-convex lens having a positive power, reduces the vergence of rays from the cube 801, thus enabling the user to perceive a virtual image at approximately 50 cm. Lens 410, a singlet plano-concave lens having a negative power, precorrects light from the ambient scene so that in combination lenses 370 and 410 transmit light relatively free of vergence change. The optimized selection of the relative power and spacing of lenses 410 and 370, and/or the use of multiple lenses (doublets for example) as provided for in this invention, will yield reduced overall distortion of the ambient image as seen through the cube. The overall thickness of the main lens 300 (934 in FIG. 16A) in this embodiment is 6.25 mm.

Figure 29:
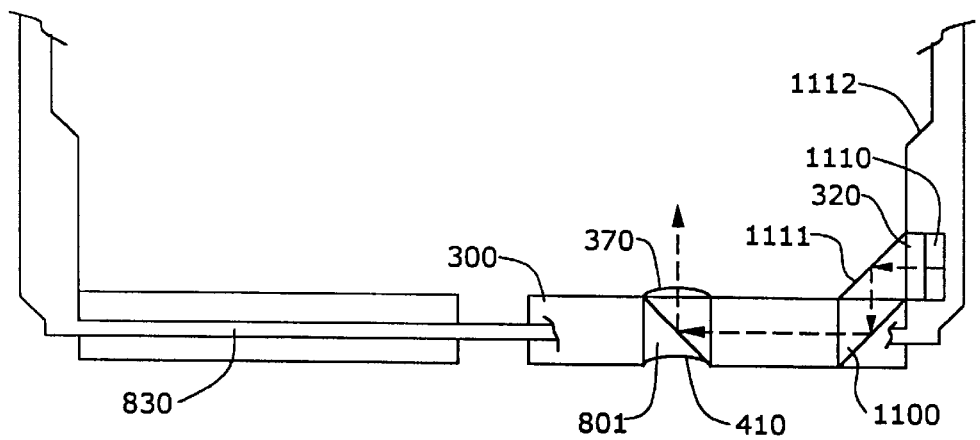
FIG. 29 is a plan view of a further embodiment of a pair of eyeglasses according to the present invention.

Complete concealment of the display system within the eyeglasses frame 830 is possible by repackaging the backlight 1103 and display 320 so as to be contained within a housing internal to the eyeglass frame. FIG. 29 illustrates a method of packaging a flat backlight 1110, display 320 and prism 1111 within the temple 1112 of eyeglasses to conceal the display. Additionally, the lenses 370 and 410, or other optics, can be embedded within the main lens 300 as shown in FIG. 29 or as previously described herein. Sensors and lenses (i.e. a camera system) can be added, as can an eyetracking system, both of which have been previously described herein. In this embodiment, the appearance of the main lens 300 is similar to a bifocal lens. FIG. 29 shows a monocular system; however, two main lenses 300, left and right, may be employed for a binocular system. Also, the left main lens 300 may house the display system, while the right main lens 300 may house a sensor system. The presence of embedded optics can be further disguised by using polarizing, photochromic, tinted, or reflective films in the manner of sunglasses. The result is an eyeglasses display system having the aesthetic appeal of conventional eyewear, with no display, camera, or eyetracker evident upon casual inspection.

The invention is not to be limited by what has been particularly shown and described, except as indicated by the appended claims.

What is claimed is:

1. A head-mountable image combining lens system for mounting on a user's head for use with a user's eye, the head-mountable image combining lens system comprising:
   a support frame configured to be supported by the user's head;
   a lens system supported by the support frame in front of an eye of the user comprising:
      at least a first lens having two optical surfaces arranged to permit passage of some ambient light by the first lens through the two optical surfaces;
      an optical pathway disposed internally within the first lens to receive light from an image source separate from the ambient light, the optical pathway having at least a portion disposed along and between the two optical surfaces of the first lens; and
      an insert disposed internally within the first lens, the insert comprising an interface disposed to redirect light, which has passed along at least the portion of the optical pathway, out of the first lens to a user's eye; and
   a further portion of the optical pathway, the further portion of the optical pathway supported by the support frame and disposed to direct light from the image source to the portion of the optical pathway disposed internally in the lens system.

2. The system of claim 1, wherein the insert comprises two materials having different indices of refraction, the two materials separated by the interface.

3. The system of claim 2, wherein the interface comprises an air gap between the two materials.

4. The system of claim 1, wherein the insert comprises a beam combiner.

5. The system of claim 4, wherein the beam combiner comprises a reversed beam splitter.

6. The system of claim 1, wherein the insert comprises a polarizing beam splitter.

7. The system of claim 1, wherein the interface is totally internally reflecting.

8. The system of claim 1, wherein the insert comprises a semi-transmitting mirror.

9. The system of claim 1, wherein the interface is planar.

10. The system of claim 1, wherein the interface is curved to provide a preselected optical power.

11. The system of claim 1, wherein the interface is placed at an angle preselected to position an image to be viewed.

12. The system of claim 1, wherein the interface includes an interference coating to split light paths.

13. The system of claim 1, wherein the insert comprises a holographic combiner.

14. The system of claim 1, wherein the lens system further comprises a second lens disposed on the optical pathway between the interface and the user's eye to provide a preselected magnification.

15. The system of claim 14, wherein the second lens is spaced by an air gap from the insert.

16. The system of claim 14, wherein the second lens is integral with the first lens.

17. The system of claim 14, wherein the second lens is glued to the first lens.

18. The system of claim 14, wherein the second lens is molded with the first lens.

19. The system of claim 14, wherein the second lens is an achromatic lens.

20. The system of claim 14, further comprising an additional lens between the insert and a portion of the ambient light which passes through the further lens, the additional lens having an optical power preselected to counter the optical power of the second lens such that the portion of the ambient light is of a desired magnification.

21. The system of claim 1, wherein the lens system further comprises a second lens disposed on the optical pathway between the interface and the image source and preselected to provide a desired magnification.

22. The system of claim 20, wherein the second is spaced by an air gap from the first lens.

23. The system of claim 20, wherein the second lens is integral with the first lens.

24. The system of claim 20, wherein the second lens is glued to the first lens.

25. The system of claim 20, wherein the second lens is molded with the first lens.

26. The system of claim 20, wherein the second lens is an achromatic lens.

27. The system of claim 1, wherein the lens system further comprises a set of further lenses disposed on the optical pathway and preselected to provide a desired magnification and a desired correction of lens aberration.

28. The system of claim 1, further comprising a further insert disposed internally within the first lens, the further insert comprising a further interface disposed between the insert and the image source to redirect light from the image source to the user's eye along the portion of the optical pathway.

29. The system of claim 28, wherein the further interface is totally internally reflecting.

30. The system of claim 28, wherein the further insert comprises a beam combiner.

31. The system of claim 28, wherein the further insert comprises a mirror.

32. The system of claim 28, wherein the further insert comprises a beam splitter disposed to facilitate illumination of the image source with ambient light.

33. The system of claim 28, further comprising a further lens disposed on the optical pathway between the further interface and the image source to provide a preselected magnification.

34. The system of claim 1, further comprising a mirror disposed between the insert and the image source to redirect light from the image source to the user's eye along the portion of the optical pathway.

35. The system of claim 34, wherein the mirror is mounted on an edge of the first lens.

36. The system of claim 34, wherein the mirror further includes a layer of a material having a thermal conductivity preselected to become damaged by an intense beam on the optical pathway.

37. The system of claim 34, wherein the mirror further includes a layer of a material having a coefficient of thermal expansion preselected to defocus an intense beam on the optical pathway.

38. The system of claim 1, further comprising at least one field lens disposed internally within the first lens on the portion of the optical pathway between the insert and the image source.

39. The system of claim 1, further comprising an opaque disc disposed on one of the generally opposed surfaces adjacent the insert to prevent passage of ambient light through the insert.

40. The system of claim 1, further comprising a reflecting element internally disposed within the first lens between the insert and one of the optical surfaces, the interface being reflective to redirect light from the image source to the reflecting element and being transmissive to pass light reflected from or transmitted by the reflecting element to the other of the optical surfaces, whereby the user perceives a virtual image in space.

41. The system of claim 40, wherein the reflecting element is curved to alter vergence of the reflected light from the reflecting element.

42. The system of claim 40, wherein the insert comprises a half-silvered mirror or beam splitter cube.

43. The system of claim 40, wherein the insert comprises a polarizing beam splitter, and a polarization rotator is disposed between the reflecting element and the insert.

44. The system of claim 40, further comprising an optical coating on the interface.

45. The system of claim 40, further comprising an optical coating on the reflecting element.

46. The system of claim 1, further comprising a reflecting element internally disposed within the first lens adjacent to the insert, the interface being transmissive to light from the image source and being reflective to light from the reflecting element to redirect light to one of the optical surfaces, whereby the user perceives a virtual image in space.

47. The system of claim 46, wherein the reflecting element is curved to alter vergence of the reflected light from the reflecting element.

48. The system of claim 46, wherein the insert comprises a half-silvered mirror or beam splitter cube.

49. The system of claim 46, wherein the insert comprises a polarizing beam splitter, and a polarization rotator is disposed between the reflecting element and the insert.

50. The system of claim 46, further comprising an optical coating on the interface.

51. The system of claim 46, further comprising an optical coating on the reflecting element.

52. The system of claim 1, further comprising a beam scanning assembly in optical communication with the lens system.

53. The system of claim 1, wherein the insert comprises two pairs of interfaces disposed to redirect light on the optical pathway to an alternate optical pathway to the user's eye to increase a field of view.

54. The system of claim 1, wherein at least one of the optical surfaces of the first lens is provided with a curvature preselected to correct the user's vision.

55. A head-mountable image combining system for mounting the lens system of claim 1 on the user's head, comprising:
a support frame configured to be supported by the user's head; and
the lens system of claim 1 supported by the support frame in front of an eye of the user.

56. The system of claim 55, further comprising a further portion of the optical pathway, the further portion supported by the support frame and disposed to direct light from the image source to the portion of the optical pathway disposed internally in the lens system.

57. The system of claim 1, further comprising a further interface for redirecting light on the further portion of the optical pathway to the portion of the optical pathway.

58. The system of claim 1, wherein the further portion of the optical pathway comprises an image relay.

59. The system of claim 58, wherein the image relay comprises a lens relay.

60. The system of claim 58, wherein the image relay comprises a coherent optical fiber bundle.

61. The system of claim 58, wherein the image relay comprises a gradient index lens image conduit.

62. The system of claim 58, further comprising an adjustable mount attached to the image relay and to the lens system to join the further portion of the optical pathway to the portion of the optical pathway.

63. The system of claim 62, wherein the adjustable mount comprises a first tube attached to the support frame and a second tube frictionally fitted over an end of the image relay and slidably received within the first tube, whereby the further portion of the optical pathway is adjustable relative to the portion of the optical pathway.

64. The system of claim 62, wherein the adjustable mount comprises an internally threaded tube attached to the support frame and an externally threaded tube attached to an end of the image relay and threadably received within the internally threaded tube, whereby the further portion of the optical pathway is adjustable relative to the portion of the optical pathway.

65. The system of claim 58, wherein the image relay includes an exit end and a further lens is located proximate the exit end to provide a preselected optical power.

66. The system of claim 1, wherein the image source is supported by the support frame at a location proximate the rear of the user's head.

67. The system of claim 1, wherein the image source comprises a flat panel active matrix electroluminescent display.

68. The system of claim 1, wherein the image source comprises a liquid crystal display.

69. The system of claim 68, wherein the insert comprises a polarizing beam splitter disposed to serve as an analyzer for the liquid crystal display.

70. The system of claim 68, further comprising a polarizing beam splitter disposed internally within the first lens, to redirect light from the image source to the user's eye along the portion of the optical pathway, the beam splitter further disposed to serve as a polarization analyzer for the liquid crystal display.

71. The system of claim 66, wherein the image source comprises a flat panel field emission display.

72. The system of claim 66, wherein the image source comprises a cathode ray tube.

73. The system of claim 66, wherein the image source comprises an array of light emitting diodes.

74. The system of claim 66, wherein the image source comprises multiple displays located at different distances from an entrance end of the further optical path.

75. The system of claim 66, further comprising a fiber optic taper between the image source and the further portion of the optical pathway to match dimensions of an image from the image source to the further portion of the optical pathway.

76. The system of claim 66, further comprising an additional lens system between the image source and the further portion of the optical pathway to match dimensions of an image from the image source to the further portion of the optical pathway.

77. The system of claim 1, wherein the additional lens system is mounted within a housing, the housing being adjustable to adjust relative positions of the image source, the further portion of the optical pathway, and the lens system to provide focusing of an image.

78. The system of claim 1, wherein the further portion of the optical pathway includes at least one mirror so that the further portion can be folded.

79. The system of claim 1, further including an eye lens disposed internally within the first lens on the portion of the optical pathway and an objective lens disposed on the further portion of the optical pathway, the optical powers and locations of the eye lens and the objective lens being preselected to achieve a desired focus, degree of magnification, and collimation distance.

80. The system of claim 57, wherein the further interface comprises a mirror or a prism.

81. The system of claim 1, further including an optical element disposed on the further portion of the optical pathway to increase a field of view.

82. The system of claim 81, wherein the optical element comprises a diffusing screen, a microlens array, a fiber-optic faceplate or a diffractive optical element.

83. The system of claim 81, wherein the optical element comprises a fiber-optic face plate having a curvature on one or both surfaces preselected to improve the field flatness of the image.

84. The system of claim 1, further comprising a sensor located to receive rays returned from the user's eye along the optical pathway.

85. The system of claim 1, further comprising a sensor located to receive rays from the user's environment.

86. The system of claim 1, wherein the support frame comprises a pair of eyeglasses.

87. The system of claim 1, wherein the support frame comprises a face mask.

88. The system of claim 1, wherein the support frame comprises a diver's mask, a firefighter's face shield, an astronaut's space suit mask, or a hazardous material body suit face mask.

89. The system of claim 1, further comprising computer circuits mounted to the support frame and in communication with the image source, and the image source is mounted to an edge of the support frame.

90. The system of claim 1, further comprising a housing disposed to conceal the computer circuits and the image source.

91. A head-mountable image combining system comprising:
an eyeglasses frame having a pair of lens holders and a pair of temples configured to be supported on a user's head;
an image source mounted to the eyeglasses frame;
a main lens supported by the eyeglasses frame in one of the pair of lens holders in front of an eye of the user, the main lens comprising:
two optical surfaces arranged to permit passage of some ambient light by the main lens through the two optical surfaces;
a prism embedded within the main lens to direct light from the image source through the main lens between the two optical surfaces; and
a beam splitting cube embedded with the main lens in a position to direct light from the prism to the user's eye; and
a second lens system supported by the eyeglasses frame in the other of the pair of lens holders in front of the other eye of the user.

92. The system of claim 91, wherein the beam splitting cube is polarizing.

93. The system of claim 91, wherein the image source comprises an active matrix liquid crystal display.

94. The system of claim 93, further comprising a backlight disposed to light the active matrix liquid crystal display.

95. The system of claim 91, wherein the main lens further comprises a lens having a positive power disposed between the beam splitting cube and the user's eye and a lens having a negative power disposed between the beam splitting cube and ambient scenery.

96. The system of claim 91, further comprising a housing attached to one of the pair of temples, the image source disposed within the housing.

97. The system of claim 91, wherein the main lens is integrally formed by molding, casting, or machining.

98. A lens system for an eyeglass frame, the eyeglass frame having a pair of lens holders adapted to receive an image source, the lens system comprising:
a main lens configured to be supported by the eyeglass frame in one of the pair of lens holders in front of an eye of a user, the main lens comprising:
two optical surfaces arranged to permit passage of ambient light by the main lens through the two optical surfaces;
an optical pathway disposed internally within the main lens to receive light from an image source separate from the ambient light, the optical pathway having at least a portion disposed along and between the two optical surfaces;
a first insert embedded within the main lens in a position to direct light from the portion of the optical pathway to the user's eye, the first insert including an interface, the interface being transmissive to light on the portion of the optical pathway;
a reflecting element embedded within the main lens adjacent to the first insert, the interface further being reflective to light from the reflecting element to redirect light to one of the optical surfaces, whereby the user perceives a virtual image in space; and
a second insert embedded within the main lens to direct light from the image source onto the portion of the optical pathway between the two optical surfaces.

99. The lens system of claim 98, wherein the first insert comprises a partially transmissive mirror, a beam splitter cube, a polarizing beam splitter, or a fully reflective mirror.

100. The lens system of claim 98, further comprising an optical coating on the interface.

101. The lens system of claim 98, wherein the interface comprises a polarizing beam splitter and the main lens further includes a polarization rotator disposed between the interface and the reflecting element.

102. The lens system of claim 98, wherein the reflecting element is curved to alter vergence of the reflected light from the reflecting element.

103. The lens system of claim 98, further comprising an optical coating on the reflecting element.

104. The lens system of claim 98, wherein the second insert comprises a further interface oriented to redirect light onto the portion of the optical pathway.

105. The lens system of claim 98, wherein the second insert comprises a polarizing beam splitter, a mirror, or a prism.

106. An eyeglass frame comprising:
a holder configured to hold a pair of lenses in front of a user's eyes;
a pair of temples attached to the holder, each temple configured to be worn over an ear of the user;
a housing mounted to one of the temples; and
an optical pathway supported by the housing and operative to transmit an image from an image source directly into one of the pair of lenses in the holder to a lens system supported within the one of the pair of lenses in the holder.

107. The eyeglass frame of claim 106, wherein the optical pathway includes an image relay.

108. The eyeglass frame of claim 107, wherein the image relay comprises a lens relay, a coherent optical fiber bundle, or a gradient index lens image conduit.

109. The eyeglass frame of claim 107, wherein the housing is adjustable to provide focus adjustment.

110. A head-mountable image combining system comprising:

an eyeglass frame having a pair of lens holders and a pair of temples configured to be supported on a user's head;

an optical pathway from an image source mounted to the eyeglass frame;

a main lens supported by the eyeglass frame in one of the pair of lens holders in front of an eye of the user, the main lens comprising:

two optical surfaces arranged to permit passage of ambient light by the main lens through the two optical surfaces;

an insert embedded within the main lens to direct light on the optical pathway from the image source through the main lens between the two optical surfaces;

a further insert embedded within the main lens in a position to direct light from the insert to the user's eye, the further insert including an interface transmissive to light from the insert;

a reflecting element embedded within the main lens adjacent to the further insert, the interface further being reflective to light from the reflecting element to redirect light to one of the optical surfaces, whereby the user is able to perceive a virtual image in space; and a second lens system supported by the eyeglass frame in the other of the pair of lens holders in front of the other eye of the user.

111. The system of claim 110, wherein the further insert comprises a partially transmissive mirror, a beam splitter cube, a polarizing beam splitter, or a fully reflective mirror.

112. The system of claim 110, wherein the interface comprises a polarizing beam splitter and the main lens further includes a polarization rotator disposed between the interface and the reflecting element.

113. The system of claim 110, wherein the reflecting element is curved to alter vergence of the reflected light from the reflecting element.

114. The system of claim 1, wherein the insert comprises a fully reflective mirror.

* * * * *

UNITED STATES PATENT AND TRADEMARK OFFICE
CERTIFICATE OF CORRECTION

PATENT NO. : 5,886,822
DATED : March 23, 1999
INVENTOR(S) : Mark B. Spitzer

It is certified that error appears in the above-identified patent and that said Letters Patent is hereby corrected as shown below:

Column 17,
Line 33, "450" should read --45°--;

Column 22, Claim 67,
Line 26, "claim 1", should read --claim 66--;

Column 22, Claim 68,
Line 29, "claim 1", should read --claim 66--.

Signed and Sealed this

Nineteenth Day of June, 2001

*Attest:*

*Attesting Officer*

NICHOLAS P. GODICI
*Acting Director of the United States Patent and Trademark Office*